United States Patent
He et al.

(10) Patent No.: US 10,552,705 B2
(45) Date of Patent: Feb. 4, 2020

(54) CHARACTER SEGMENTATION METHOD, APPARATUS AND ELECTRONIC DEVICE

(71) Applicant: Alibaba Group Holding Limited, Grand Cayman (KY)

(72) Inventors: Mengchao He, Hangzhou (CN); Yuan He, Hangzhou (CN); Hongming Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 79 days.

(21) Appl. No.: 15/887,653

(22) Filed: Feb. 2, 2018

(65) Prior Publication Data
US 2018/0157927 A1 Jun. 7, 2018

Related U.S. Application Data

(63) Continuation of application No. PCT/CN2016/090824, filed on Jul. 21, 2016.

(30) Foreign Application Priority Data

Aug. 4, 2015 (CN) .......................... 2015 1 0471100

(51) Int. Cl.
*G06K 9/34* (2006.01)
*G06K 9/00* (2006.01)

(52) U.S. Cl.
CPC ......... *G06K 9/344* (2013.01); *G06K 9/00536* (2013.01); *G06K 9/342* (2013.01); *G06K 9/348* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,384,864 A | * | 1/1995 | Spitz | G06K 9/348 382/174 |
| 5,497,432 A | * | 3/1996 | Nishida | G06K 9/344 382/178 |

(Continued)

FOREIGN PATENT DOCUMENTS

| | | |
|---|---|---|
| CN | 1941838 A | 4/2007 |
| CN | 101520851 | 9/2009 |

(Continued)

OTHER PUBLICATIONS

Translation of International Search Report from corresponding PCT application No. PCT/CN2016/090824 dated Oct. 27, 2016, 3 pages.

(Continued)

*Primary Examiner* — Tsung Yin Tsai
(74) *Attorney, Agent, or Firm* — Lee & Hayes, P.C.

(57) ABSTRACT

A method, an apparatus and an electronic device of character segmentation are disclosed. The method includes obtaining character segmentation points of a character image to be segmented as candidate segmentation points using a predetermined segmentation point generation algorithm, the character image to be segmented being a foreground character image that is obtained by removing a background image from an original grayscale character image; selecting and obtaining correct segmentation points from the candidate segmentation points based on the original grayscale character image and a pre-generated segmentation point classifier; and performing character segmentation for the character image to be segmented based on the correct segmentation points. Using the method provided by the present disclosure, candidate segmentation points can be filtered to obtain correct segmentation points, thus avoiding overly segmentation of a character image having phenomena such as character breaking, and thereby achieving an effect of improvement on the accuracy of character segmentation.

20 Claims, 24 Drawing Sheets

(56) References Cited

U.S. PATENT DOCUMENTS

| | | | | |
|---|---|---|---|---|
| 5,561,720 | A * | 10/1996 | Lellmann | G06K 9/342 382/178 |
| 5,809,166 | A * | 9/1998 | Huang | G06K 9/342 382/174 |
| 6,011,865 | A * | 1/2000 | Fujisaki | G06K 9/6293 382/189 |
| 6,064,769 | A * | 5/2000 | Nakao | G06K 9/00463 382/177 |
| 7,471,826 | B1 * | 12/2008 | Navon | G06K 9/344 358/453 |
| 2004/0146200 | A1 * | 7/2004 | Andel | G06K 9/344 382/177 |
| 2004/0146216 | A1 * | 7/2004 | Andel | G06K 9/342 382/277 |
| 2010/0303360 | A1 * | 12/2010 | Matsuda | H04N 1/3871 382/195 |
| 2013/0182909 | A1 * | 7/2013 | Rodriguez-Serrano | G06K 9/34 382/105 |
| 2013/0272607 | A1 * | 10/2013 | Chattopadhyay | G06K 9/344 382/171 |

FOREIGN PATENT DOCUMENTS

| | | |
|---|---|---|
| CN | 101770576 | 7/2010 |
| CN | 101877050 | 11/2010 |
| CN | 102496021 | 6/2012 |
| CN | 104408455 A | 3/2015 |
| CN | 104657989 | 5/2015 |

OTHER PUBLICATIONS

Translation of Written Opinion from corresponding PCT application No. PCT/CN2016/090824 dated Oct. 27, 2016, 6 pages.
Machine Translation of second Chinese Office Action dated Jul. 19, 2019 for Chinese patent Application No. 201510471100.7, a counterpart foreign application of U.S. Appl. No. 15/887,653, 30 pages.
Machine Translation of first Chinese Office Action dated Jan. 17, 2019 for Chinese patent Application No. 201510471100.7, a counterpart foreign application of U.S. Appl. No. 15/887,653, 36 pages.
Chinese Search Report dated Jul. 11, 2019 for Chinese patent application No. 201510471100.7, 2 pages.

* cited by examiner

CHARACTER SEGMENTATION METHOD, APPARATUS AND ELECTRONIC DEVICE

CROSS REFERENCE TO RELATED PATENT APPLICATIONS

This application claims priority to and is a continuation of PCT Patent Application No. PCT/CN2016/090824 filed on 21 Jul. 2016, and is related to and claims priority to Chinese Patent Application No. 201510471100.7, filed on 4 Aug. 2015, entitled "Character Segmentation Method, Apparatus and Electronic Device," which are hereby incorporated by reference in their entirety.

TECHNICAL FIELD

The present disclosure relates to the field of character recognition technologies, and particularly to character segmentation methods, apparatuses and electronic devices. The present disclosure further relates to character recognition systems, image separation methods, apparatuses and electronic devices, and inclined character letter correction methods, apparatuses and electronic devices.

BACKGROUND

OCR (Optical character recognition) is a process for obtaining textual information through analysis and recognition of an image file of textual information. This technology was initially used by a postal system to recognize zip codes to implement an automatic mail sorting function. Along with the rapid development of optical imaging devices (e.g., a scanner, a digital camera, a mobile phone, etc.), OCR has been used more popularly. For example, the $6^{th}$ national census in 2010 used the OCR technology to perform an automatic information input operation for about 800 millions of forms, which greatly reduced manpower costs.

The OCR technology usually includes the following operations: 1) pre-processing an input image, which includes gray processing; 2) extracting a textual field image via a layout analysis; 3) generating a binary textual field image; 4) perform character segmentation for the binary textual field image; and 5) outputting a result from character recognition. The character segmentation is one of many critical stages in the entire character recognition process, having a very great influence in the performance of the final recognition. The character segmentation is to segment each character image (which includes a Chinese character, an English letter, a number, a punctuation, etc.) from a single textual image. The quality of the character segmentation directly affects the performance of an OCR system. Apparently, a recognizer can obtain an accurate recognition only when an associated segmentation is accurate. An incorrectly segmented character cannot be recognized correctly. Currently, technologies of recognizing a single character have been very mature. According to development results of practical systems, errors of final recognition results of the systems are mostly due to errors in segmentation. Therefore, a good character segmentation method is particularly important.

Currently, common character segmentation methods mainly include the following types:

1) Vertical Projection Based Character Segmentation Method

This method first counts respective numbers of black spots on vertical scanning lines of an input image, and performs character segmentation at troughs of counted value features.

2) Hyphenation Based Character Segmentation Method

This method generally includes an estimation sub-function, a combination sub-function, and a determination sub-function. Information of characters such as distances between the characters, widths of the characters and center-center distances of the characters are first obtained by vertical projection. An average character width and an average distance between characters are then estimated using the estimation sub-function. The combination sub-function is then used for processing each portion that is segmented, and combining incorrect segments that are potentially caused by character segmentation. The determination sub-function then performs a determination about whether to accept such combination.

3) Mathematical Morphology Based Character Segmentation Method

Morphology completes an analysis of geometrical features using morphological conversions of dedicated fields. The morphological conversions are implemented by selecting interactions between a relatively small image feature set of a known structure (structures elements) and a target. All morphology conversions can be constructed from basic morphology conversions such as "erosion/expansion", "thickening/thinning", "breaking/closing", etc., and a selection of a suitable element structure and an image set.

4) Connected Domain Analysis Based Character Segmentation Method

This method performs segmentation based on a principle that pixels of a same character form a connected domain, and performs segmentation again for regions having relatively large connected domains through some strategies such as character widths.

5) Recognition Based Character Segmentation Method

The method uses a moving-window approach that moves a limited window along a character line, and sends portions of images within the window for recognition. If the portions satisfy a certain recognition requirement, this is considered as a correct segmentation. Otherwise, the size of the limited window is adjusted.

The above commonly used character segmentation methods mostly need to rely on prior information of image characters, such as a character width, a character height, a character separation distance, a character center-to-center spacing, etc., and are suitable for performing character segmentation for relatively regular textual field images. However, since phenomena such as character breaking, character blurring, background interference, etc., may exist in a textual field image after binary conversion, the textual field image after the binary conversion may be overly segmented.

In short, existing technologies have the problem of an excessive segmentation of a character image that has phenomena such as character breaking or character blurring.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The present disclosure provides a method, an apparatus and an electronic device of character segmentation, to solve the problem of an excessive segmentation of a character image that has phenomena such as character breaking or character blurring in the existing technologies. The present disclosure further provides a character recognition system, a method, an apparatus and an electronic device of image separation, and a method, an apparatus and an electronic device of inclined character correction.

The present disclosure provides a character segmentation method, which includes obtaining character segmentation points of a character image to be segmented as candidate segmentation points using a predetermined segmentation point generation algorithm, the character image to be segmented being a foreground character image that is obtained by removing a background image from an original grayscale character image; selecting and obtaining correct segmentation points from the candidate segmentation points based on the original grayscale character image and a pre-generated segmentation point classifier; and performing character segmentation for the character image to be segmented based on the correct segmentation points.

Furthermore, the present disclosure also provides a character recognition system, which includes any one of the above character segmentation apparatus.

Moreover, the present disclosure also provides an image separation method, which includes obtaining a gray image to be separated; obtaining a pixel threshold value of foreground pixels of the gray image to be separated as a first pixel threshold value through a global binarization algorithm; setting pixels with pixel values less than the first pixel threshold value in the gray image to be separated as first foreground pixels; setting an image formed by the first foreground pixels as a first foreground image; and binarizing the first foreground image through a local binarization algorithm, and separating and obtaining a binary image of the gray image to be separated from the first foreground image.

Furthermore, the present disclosure also provides an inclined character correction method, which includes obtaining predetermined edge pixels of characters included in a character image to be corrected; calculating and obtaining an angle of inclined character correction based on the obtained predetermined edge pixels, a predetermined starting correction angle and a predetermined ending correction angle; and performing the inclined character correction on the character image to be corrected based on the angle of inclined character correction to generate an inclined-letter-corrected character image.

Compared with existing technologies, the present disclosure has the following advantages.

The character segmentation method, apparatus and electronic device provided by the present disclosure obtain character segmentation points of a character image to be segmented as candidate segmentation points using a predetermined segmentation point generation algorithm, wherein the character image to be segmented is a foreground character image that is obtained by removing a background image from an original grayscale character image; select and obtain correct segmentation points from the candidate segmentation points based on the original grayscale character image and a pre-generated segmentation point classifier; and finally perform character segmentation for the character image to be segmented based on the correct segmentation points. This can filter candidate segmentation points using an original grayscale character image, and correct segmentation points, thus avoiding overly segmentation of a character image having phenomena such as character breaking or character blurring, and thereby achieving an effect of improvement on the accuracy of character segmentation.

DETAILED DESCRIPTION

Specific details are described hereinafter to help understand the present disclosure fully. However, the present disclosure can be implemented by other methods that are not described herein. One skilled in the art can make generalizations without violating the content of the present disclosure. Therefore, the present disclosure is not limited by the specific implementations disclosed herein.

In the present disclosure, a method, an apparatus, and an electronic device of character segmentation, a character recognition system, a method, an apparatus and an electronic device of image separation, and a method, an apparatus and an electronic device for correcting an inclined character are provided. The following embodiments are described in details one by one.

The basic ideas of the core of the character segmentation method provided by the present disclosure are to use an original grayscale character image to filter candidate segmentation points, to obtain correct segmentation points, and to segment characters according to the correct segmentation points. Since the correct segmentation points are obtained after filtering the candidate segmentation points, thus avoiding excessive segmentation of character images with phenomena such as character breaking or character blurring, so that the effect of improving the accuracy of character segmentation is achieved.

Figure 1:
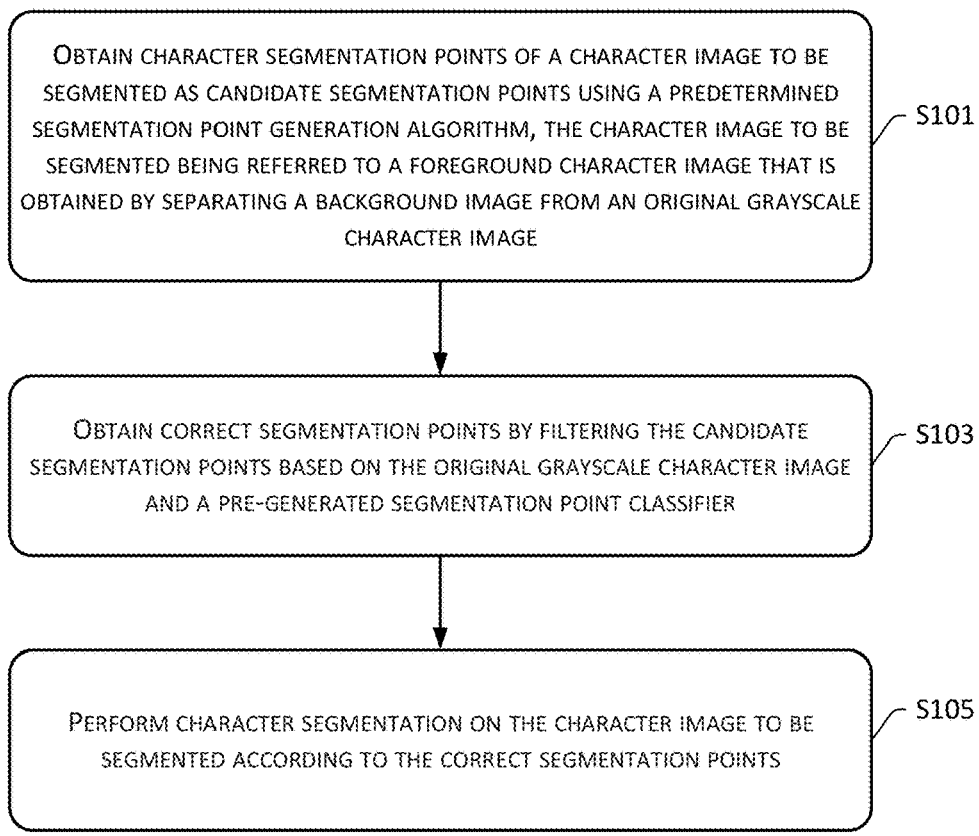
FIG. 1 is a flowchart of an exemplary character segmentation method of the present disclosure.

FIG. 1 shows a flowchart of an exemplary character segmentation method 100 of the present disclosure.

S101 obtains character segmentation points of a character image to be segmented as candidate segmentation points using a predetermined segmentation point generation algorithm.

The character image to be segmented according to the embodiments of the present disclosure refers to a foreground character image that is obtained by separating a background image from an original grayscale character image. In practical applications, the foreground character image from which the background image is removed may be a grayscale character image retaining original pixel values, or may be a binary character image. Therefore, the character image to be segmented as described in the embodiments of the present disclosure may be a grayscale character image, or may be a binary character image.

According to the character segmentation method provided by the embodiments of the present disclosure, prior to obtaining the character segmentation points of the character image to be segmented using the predetermined segmentation point generation algorithm, the method further includes performing an image separation on an original grayscale character image to generate the character image to be segmented.

In digital image processing, binary images occupy a very important position. First, image binarization is conducive to further processing of an image, making the image to be simple. Furthermore, the amount of data is reduced, and an outline of a target of interest can be highlighted. Second, a grayscale image needs to be binarized to obtain a binary image in order to perform processing and analysis of the binary image.

Therefore, an image separation process of the embodiments of the present disclosure adopts a binarization method, i.e., performing binarization on an original gray character image to generate a binary image as a character image to be segmented.

The binary character image described in the embodiments of the present disclosure refers to a binary image that is obtained from an original grayscale character image having 256 brightness levels through an appropriate threshold selection and which can still reflect the overall and local features of the image. Specifically, binarization processing of an image refers to setting a grayscale value of a pixel point on the image to 0 or 255, i.e., the entire image shows a clear visual effect of black and white only. All pixels having a grayscale less than a threshold are determined to belong to a specific object, with a grayscale value of 0. Otherwise, these pixels are excluded from an area of the object, and a grayscale value thereof is 255, which represents the background or an exception of the area of the object. For a common grayscale image having 256 grayscale levels, 0 grayscale level corresponds to black, and 255 grayscale level corresponds to white. After binarization, pixels with a pixel value of 0 form black a foreground text, and pixels with a pixel value of 1 form a white background.

Binarization algorithms include two types—a global binarization method and a local adaptation binarization method. The global binarization method calculates a single threshold for each diagram, and pixels with a grayscale level greater than the threshold are marked as background, or foreground pixels otherwise. Local binarization algorithm calculates a threshold for each pixel based on information of the neighborhood of the pixel. Specifically, the local binarization algorithm also calculates a threshold surface in the entire image. If the grayscale level of a pixel (x, y) in the image is higher than a calculated value of the threshold surface at the (x, y) point, the pixel (x, y) is then marked as a background pixel, or a foreground character pixel otherwise.

The current image binarization generally uses a single global binarization algorithm or local adaptive binarization algorithm. However, defects exist in a binary image that is generated by performing binarization on an image using a single binarization algorithm. For example, a single global binarization algorithm will result in noise points in the background of the binary image, and a single local binarization algorithm will result in character breaking in the foreground of the binary image.

Therefore, the character segmentation method provided by the embodiments of the present disclosure adopts an approach that combines a global binarization algorithm and a local adaptive binarization algorithm to perform binarization on an original grayscale character image.

Figure 2:
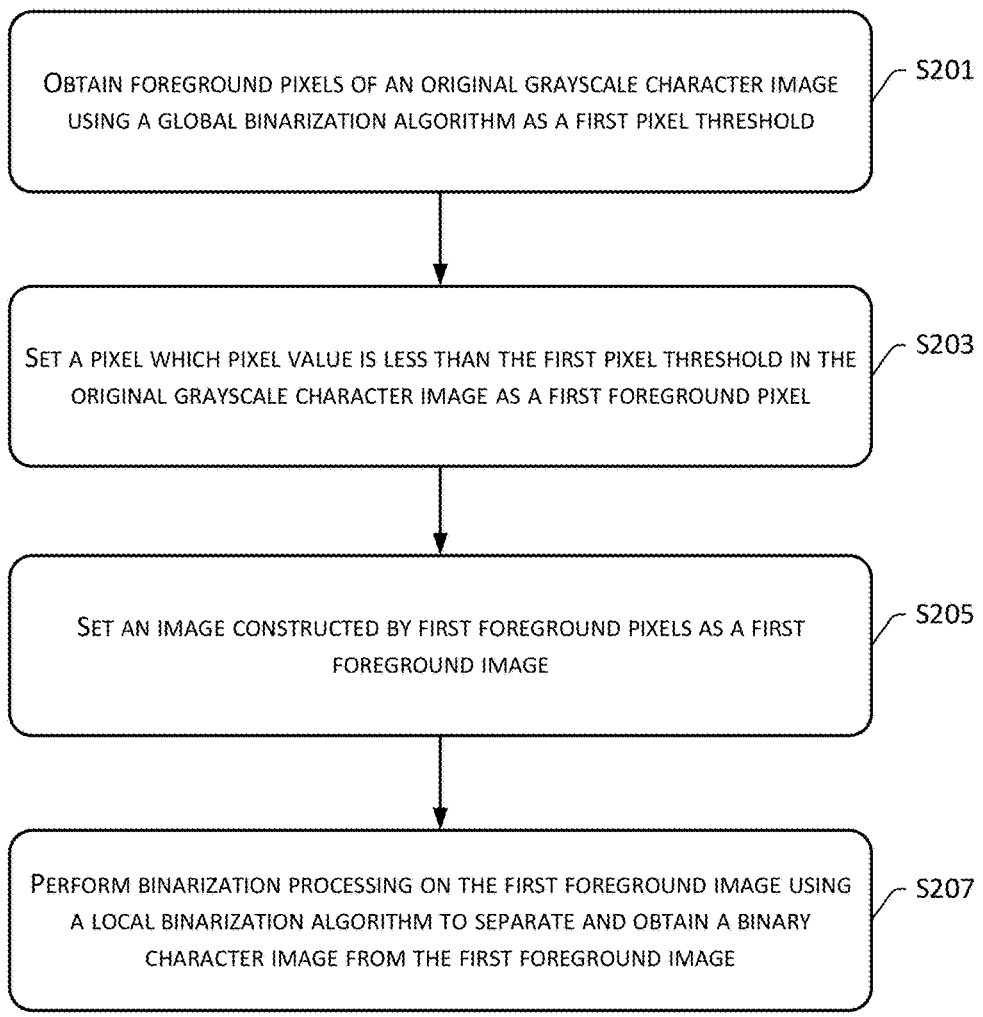
FIG. 2 is a flowchart of binarization processing of an exemplary character segmentation method of the present disclosure.

FIG. 2 shows a flowchart of binarization processing of a character segmentation method 200 in accordance with an embodiment of the present disclosure. In implementations, an original grayscale character image is binarized to generate a binary character image, which includes:

S201 obtains foreground pixels of an original grayscale character image using a global binarization algorithm as a first pixel threshold.

Commonly used global binarization algorithms include a bimodal histogram threshold segmentation method and a mean grayscale method, a differential histogram, a OSTU method, an Abutaleb method, a Kapur et al. method, a Kittler and Illingworth method and a OTSU method, etc. In practical applications, any one of the above global binarization algorithms can be selected according to the specific needs to obtain a pixel threshold of foreground pixels of an original grayscale character image.

Figure 3:
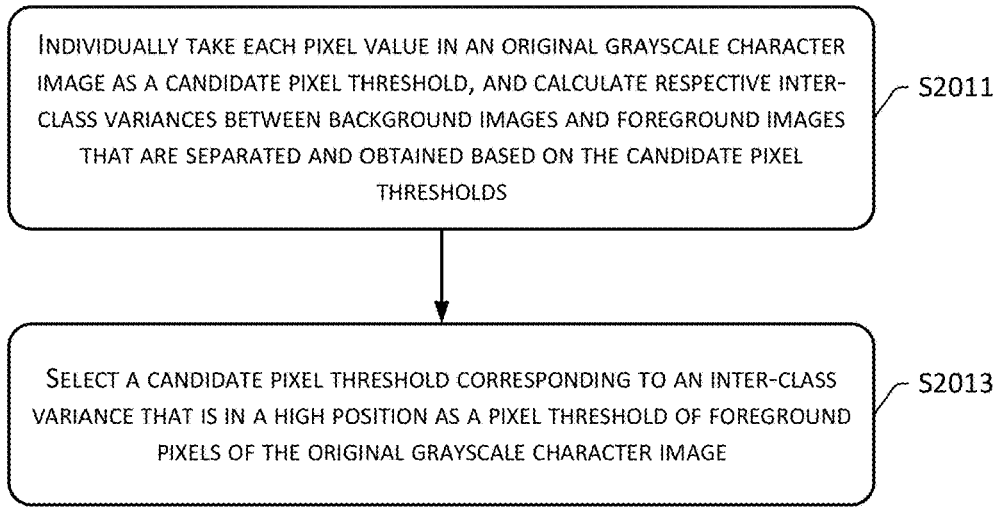
FIG. 3 is a flowchart of an operation S201 of an exemplary character segmentation method of the present disclosure.

FIG. 3 is a flowchart of an operation S201 of the character segmentation method in accordance with an embodiment of the present disclosure. In implementations, the Otsu global binarization algorithm is used to obtain a pixel threshold for foreground pixels of an original grayscale character image, which specifically includes the following operations.

S2011 individually takes each pixel value in an original grayscale character image as a candidate pixel threshold, and calculates respective inter-class variances between background images and foreground images that are separated and obtained based on the candidate pixel thresholds.

The largest inter-class variance method is proposed by a Japanese scholar Nobuyuki Otsu in 1979, and is an adaptive threshold determination method (which is also called as Otsu method, and referred to as OTSU algorithm). It divides an image into two parts—background and foreground according to grayscale features of the image. A greater inter-class variance between the background and the foreground means that a difference between the two parts that form the image is greater. When a portion of the foreground is wrongly classified as the background or a portion of the background is wrongly classified as the foreground, a difference between the two parts becomes smaller. Therefore, segmentation that maximizes the inter-class variance means that the probability of misclassification is the smallest. In summary, the core of the OTSU algorithm is to calculate the maximum of the inter-class variance between the background and the foreground, and to set a pixel value leading to the largest inter-class variance as a threshold for global binarization.

At S2011, traversal is performed from the minimum grayscale value to the maximum grayscale value. Each pixel value in the original grayscale character image is individually taken as a candidate pixel threshold, and an inter-class variance between a background image and a foreground image that are separated and obtained is calculated based on the candidate pixel threshold. In implementations, the inter-class variance is calculated using the following formula:

$$\sigma^2 = \omega_0 \cdot (\mu_0 - \mu)^2 + \omega_1 \cdot (\mu_1 - \mu)^2$$

$\sigma^2$ is the inter-class variance. $\mu$ is an average pixel value of the original grayscale character image. $\omega_0$ is a ratio between the number of pixels of the foreground image and the number of pixels of the original grayscale character image. $\omega_1$ is a ratio between the number of pixels of the background image and a number of pixels of the original grayscale character image. $\mu_0$ is an average pixel value of the foreground image. $\mu_1$ is an average pixel value of the background image. $\mu = \omega_0 \mu_0 + \omega_1 \mu_1$, $\omega_0 = N_0/(M*N)$. $\omega_1 = N_1/(M*N)$. M and N are width and height of the original grayscale character image. M*N is the number of pixels included in the original grayscale character image. $N_0$ is the number of pixels of the foreground image. $N_1$ is the number of pixels of the background image.

S2011 obtains a respective inter-class variance corresponding to each pixel value in the original grayscale character image as a candidate pixel threshold.

S2013 selects a candidate pixel threshold corresponding to an inter-class variance that is in a high position as a pixel threshold of foreground pixels of the original grayscale character image.

From the candidate pixel thresholds, a pixel threshold corresponding to an inter-class variance ranked at a high position is selected as a pixel threshold for foreground pixels of the original grayscale character image. In implementations, a candidate pixel threshold that maximizes an inter-class variance is selected as a pixel threshold for foreground pixels of the original grayscale character image.

S203 sets a pixel which pixel value is less than the first pixel threshold in the original grayscale character image as a first foreground pixel.

After the first pixel threshold is obtained at S201, a pixel value of each pixel in the original grayscale character image is respectively compared with the first pixel threshold. If the pixel value is smaller than the first pixel threshold, the respective pixel is taken as a first foreground pixel, i.e., a foreground pixel obtained after global binarization.

S205 sets an image constructed by first foreground pixels as a first foreground image.

All the pixels that are determined as the first foreground pixels form a first foreground image.

S207 performs binarization processing on the first foreground image using a local binarization algorithm to separate and obtain a binary character image from the first foreground image.

Commonly used local binarization algorithms include a Bernsen method, a Chow and Kaneko method, an Eikvil et al. method, a Markia and Hainsworth method, a Niblack method, a Taxt et al. method, a Yanowitz and Bruckstein method, a White and Rohrer's dynamic threshold algorithm, a Parker method, a White and Rohrer's integrated function algorithm, and a Trier and Taxt method, etc. In practical applications, any one of the above local binarization algorithms can be selected according to specific requirements to obtain a threshold of each pixel.

Figure 4:
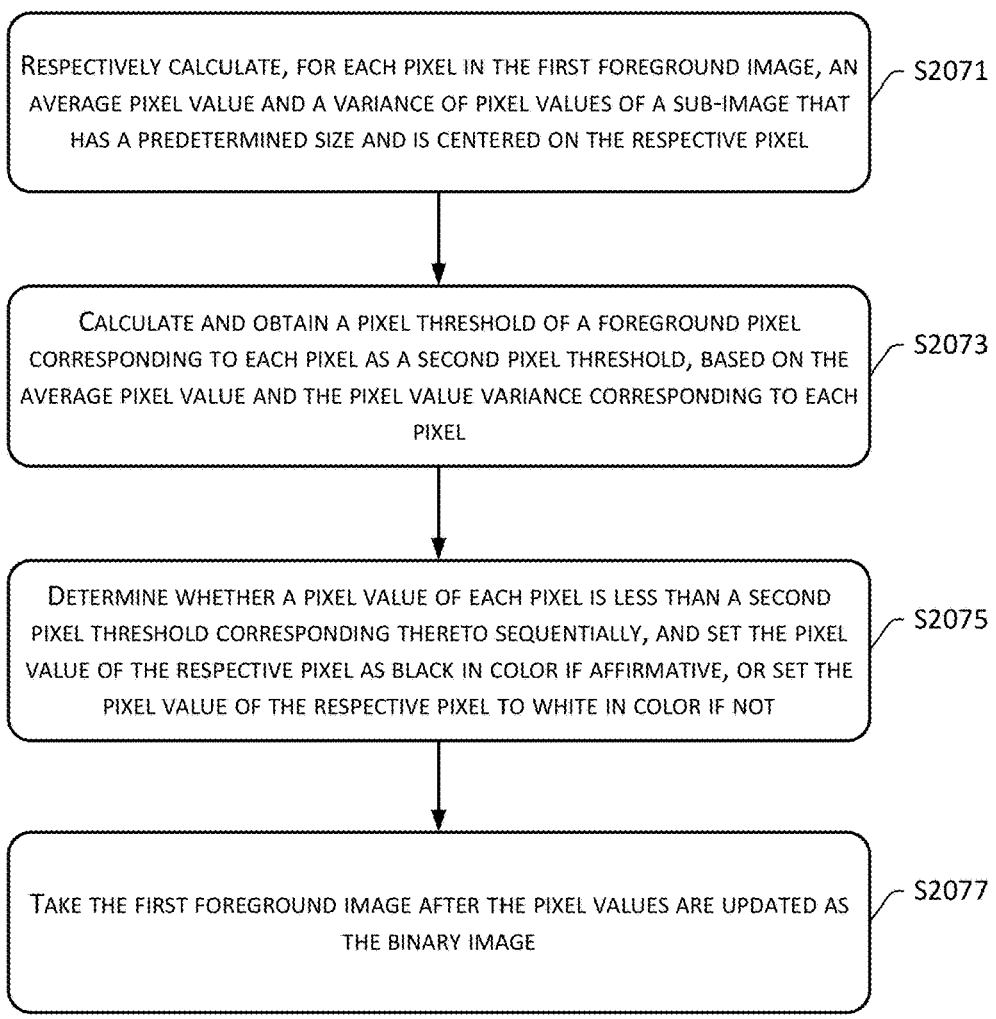
FIG. 4 is a flowchart of an operation S207 of an exemplary character segmentation method of the present disclosure.

FIG. 4 is a flowchart of an operation S207 of the character segmentation method in accordance with an embodiment of the present disclosure. In implementations, the binarization processing is performed on the first foreground image by adopting a Niblack local binarization algorithm to separate and obtain a binary character image from the first foreground image, which includes:

S2071 respectively calculates, for each pixel in the first foreground image, an average pixel value and a variance of pixel values of a sub-image that has a predetermined size and is centered on the respective pixel.

The Niblack algorithm is one of the local binarization algorithms. This algorithm computes a threshold for each pixel based on points within the neighborhood centered at the pixel. Niblack algorithm is concise and faster, having a better effect.

At S2071, each pixel in the first foreground image is traversed, and an average pixel value and a pixel value variance of a sub image are calculated using a currently traversed pixel as a center point of the sub-image with a predetermined size. In implementations, the sub-image of the predetermined size adopts a square image. In practical applications, the size of the sub-image (a window size) can be selected according to specific needs.

S2073 calculates and obtains a pixel threshold of a foreground pixel corresponding to each pixel as a second pixel threshold, based on the average pixel value and the pixel value variance corresponding to each pixel.

After obtaining the average pixel value and the pixel value variance respectively corresponding to each of the pixel values in the first foreground image at S2071, S2073 calculates and obtains a pixel threshold of the foreground pixel corresponding to each pixel based on the respective average pixel value and the respective pixel value variance corresponding to each pixel.

In implementations, calculating and obtaining the second pixel threshold of the foreground pixel respectively corresponding to each of the pixels based on the respective average pixel value and the respective pixel value variance corresponding to each of the pixels adopts the following formula:

$$T(i,j)=m(i,j)+k\cdot\sigma(i,j)$$

T(i,j) is a second pixel threshold value corresponding to a pixel at $i^{th}$ row and $j^{th}$ column in the first foreground image. m(i,j) is an average pixel value corresponding to a pixel at $i^{th}$ row and $j^{th}$ column in the first foreground image. σ(i,j) is a pixel variance corresponding to a pixel at $i^{th}$ row and $j^{th}$ column in the first foreground image. k is a variance factor.

For each pixel p(i,j) in the first foreground image, T(i,j) is determined by examining an average grayscale value m(i,j) and a standard deviation σ(i,j) in a N*N window centered thereon. In implementations, k is taken as −0.2 and N is taken as 15. If a grayscale value of p(i,j) is lower than T(i,j), the pixel is binarized to black in color, or binarized to white in color otherwise.

S2075 determines whether a pixel value of each pixel is less than a second pixel threshold corresponding thereto sequentially, and sets the pixel value of the respective pixel as black in color if affirmative, or sets the pixel value of the respective pixel to white in color if not.

After obtaining the pixel threshold for the foreground pixel corresponding to each pixel value in the first foreground image, a determination is made as to whether a pixel value of each pixel is smaller than a second pixel threshold corresponding thereto. If affirmative, the pixel value of the respective pixel is set to black in color. If not, the pixel value of the respective pixel is set to white in color.

S2077 takes the first foreground image after the pixel values are updated as the binary image.

Finally, the first foreground image, after the pixel values are updated at S2075, is used as the binary character image described in the embodiments of the present disclosure.

Figure 5:
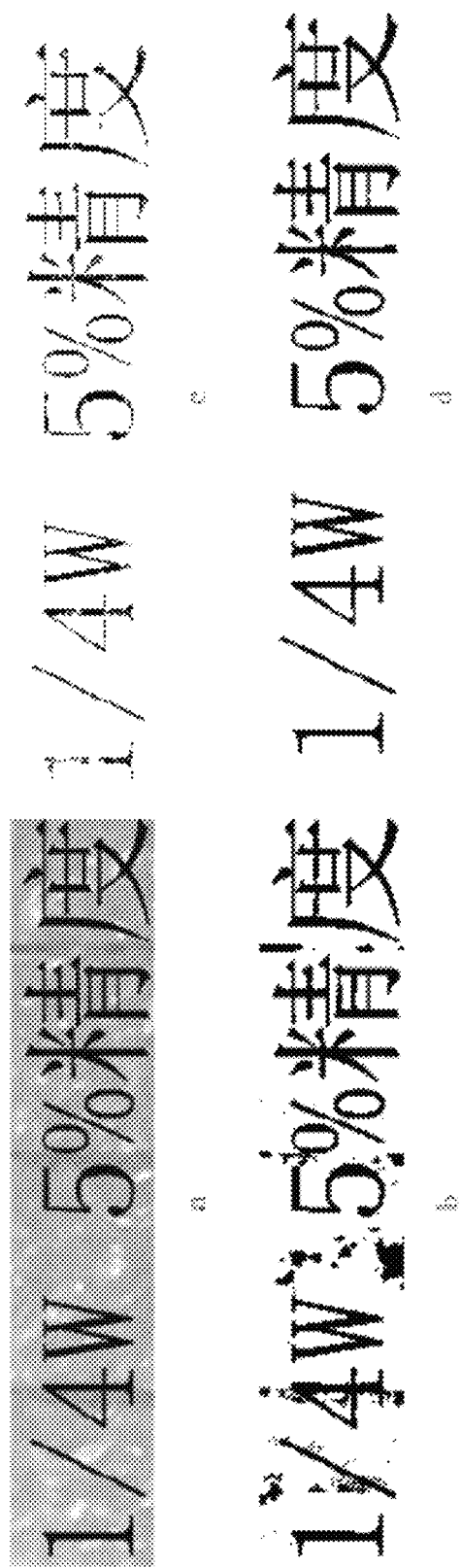
FIG. 5 is a comparison diagram of binary images obtained by various binarization methods of an exemplary character segmentation method of the present disclosure.

FIG. 5 is a comparison diagram of binary character images obtained by various binarization methods in the character segmentation method in accordance with an embodiment of the present disclosure. At FIG. 5, a sub-figure a is an original grayscale character image, a sub-figure b is a binary character image that is generated through a global binarization algorithm, and a sub-figure c is a binary character image generated by a local binarization algorithm, a sub-figure d is a binary image generated by a combination of a global binarization algorithm and a local binarization algorithm. As can be seen, the background of the binary character image of the sub-figure b has more noise points, a foreground character of the binary character image of the sub-figure c has a phenomenon of breaking, and a binary character image of the sub-figured has a better effect.

The predetermined segmentation point generation algorithm described in the embodiments of the present disclosure includes various commonly used segmentation point generation algorithms, such as a vertical projection based character segmentation method, a hyphenation based character segmentation method, a mathematical morphology based character segmentation method, a connected domain analysis based character segmentation method, or a recognition based character segmentation method. In practical applications, any one of the above segmentation point generation algorithms may be selected according to specific requirements to obtain candidate segmentation points of a character image to be segmented.

In implementations, the predetermined segmentation point generation algorithm adopts the vertical projection based character segmentation method. Specifically, character segmentation points of a character image to be segmented are obtained by the vertical projection based character segmentation method, which includes the following operations: 1) performing projection each pixel in a character image to be segmented onto a horizontal axis, and constructing a projection histogram; and 2) for each column in the projection histogram, if a number of pixels of a left adjacent column of the respective column is greater than a number of pixels of the respective column and a number of pixels of a right adjacent column of the respective column is greater than the number of pixels in the respective column, taking the respective column as a character segmentation point of the character image to be segmented; and if the number of pixels in the left adjacent column of the respective column is greater than the number of pixels in the respective column, respective numbers of pixels of more than one right adjacent column are equal to the number of pixels of the respective column, and a number of pixels of a right adjacent column of a rightmost column of the more than one right adjacent column is greater than a number of pixels of the rightmost adjacent column, taking a column at the middle position between the respective column and the right adjacent column of the rightmost column as the character segmentation point of the character image to be segmented.

1) A projection of each pixel in the character image to be segmented onto a horizontal axis is performed, and a projection histogram is constructed.

Based on the vertical projection based character segmentation method, respective numbers of occurrences of non-white pixels on vertical scanning lines of the character image to be segmented are counted first. In other words, projection processing of each pixel in the character image to be segmented onto a horizontal axis is performed, and a projection histogram is constructed. If the character image to be segmented is a binary character image, respective numbers of occurrences of black pixels on the vertical scanning lines of the character image to be segmented are counted.

2) For each column in the projection histogram, if a number of pixels of a left adjacent column of the respective column is greater than a number of pixels of the respective column and a number of pixels of a right adjacent column of the respective column is greater than the number of pixels in the respective column, taking the respective column as a character segmentation point of the character image to be segmented; and if the number of pixels in the left adjacent column of the respective column is greater than the number of pixels in the respective column, respective numbers of pixels of more than one right adjacent column are equal to the number of pixels of the respective column, and a number of pixels of a right adjacent column of a rightmost column of the more than one right adjacent column is greater than a number of pixels of the rightmost adjacent column, taking a column at the middle position between the respective column and the right adjacent column of the rightmost column as the character segmentation point of the character image to be segmented.

According to the constructed projection histogram, respective numbers of non-white pixels appearing on vertical scanning lines of the character image to be segmented are counted, and positions of troughs are taken as candidate segmentation points according to statistical features. A formal representation of this operation is as follows: {h(i) is a candidate segmentation point |h(i−1)>h(i) and h(i+1)>h(i). If h(i−1)>h(i), h(i)= . . . =h(i+j), h(i+j)<h(i+j+1) occur, h(i+j/2) is selected to be a candidate segmentation points, where h(i) is a number of pixels projected to the $i^{th}$ column.

S103 obtains correct segmentation points by filtering the candidate segmentation points based on the original grayscale character image and a pre-generated segmentation point classifier.

The candidate segmentation points in the embodiments of the present disclosure are obtained according to the character image to be segmented. Due to a potential existence of phenomena such as broken character or the like in the character image to be segmented, erroneous segmentation points may exist in the candidate segmentation points that are obtained. Segmentation of characters is directly performed based on candidate segmentation points that include erroneous segmentation points, an over-segmentation will be resulted. A pre-generated segmentation point classifier described in the embodiments of the present disclosure is used to classify candidate segmentation points, and select correct segmentation points therefrom to avoid the problem of over-segmentation.

A reason why erroneous segmentation points may exist in the candidate segmentation points is that the candidate segmentation points are obtained according to the character image to be segmented. Therefore, the character segmentation method provided in the present disclosure needs to perform segmentation based on the original grayscale character image and the pre-generated segmentation point classifier to filter out correct segmentation points from the candidate segmentation points.

Prior to executing S103, a segmentation point classifier needs to be generated first. The segmentation point classifier described in the present disclosure is learned based on historical foreground character images and respective actual results of whether correct segmentation points are included. Therefore, a process of generating the segmentation point classifier is a one-time machine learning process, and the machine learning in the embodiments of the present disclosure is supervised machine learning. To carry out supervised machine learning, learning algorithms including regression algorithms can be used. A regression algorithm belongs to a category of inductive learning. Inductive learning refers to obtaining a general description of a certain concept through inductive reasoning according to some examples of the concept. For applications that determine correct/incorrect classes of candidate segmentation points, regression algorithms that can be employed include a Bayesian algorithm, a Decision Tree algorithm, a Support Vector Machine algorithm, or a Neural Network algorithm, etc. Different algorithms have different accuracies of classification, and different algorithms have different computational complexities. In practice, any type of regression algorithm may be selected to classify candidate segmentation points according to specific application requirements.

Figure 6:
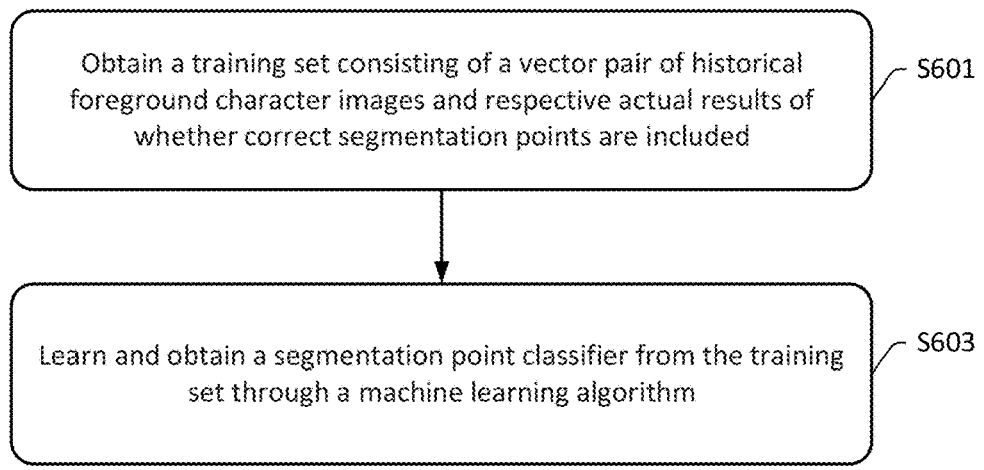
FIG. 6 is a flowchart of generating a segmentation point classifier in an exemplary character segmentation method of the present disclosure.

FIG. 6 is a flowchart of generation of a segmentation point classifier 600 of the character segmentation method according to an embodiment of the present disclosure. In implementations, a pre-generated segmentation point classifier is generated using the following operations:

S601 obtains a training set consisting of a vector pair of historical foreground character images and respective actual results of whether correct segmentation points are included.

A large amount of training data needs to be obtained for an accurate segmentation point classifier, namely, a vector pair of historical foreground character images and respective actual results of whether correct segmentation points are included. All of vector pairs need to be come from actual results of data that a model is about to simulate. These vectors can be obtained from a real running system. In practice, training data can be obtained by two methods, namely a manual annotation method and an automatic generation method.

1) Manual Annotation Method

This method includes the following operations: 1.1) manually finding correct segmentation points from an image to be segmented; b1.2) capturing a sub-image containing a correct segmentation point from the image to be segmented as a positive sample of training data and an actual result corresponding to the positive sample; and capturing a sub-image between two correct segmentation points from the image to be segmented as a negative sample of the training data, and an actual result corresponding to the negative sample being the captured sub-image including no correct segmentation point.

2) Automatic Generation Method

This method first automatically generates single character images, and then combines two single character images together to obtain a positive sample of training data, and uses a single character image as a negative sample of training.

S603 learns and obtains a segmentation point classifier from the training set through a machine learning algorithm.

In practice, a variety of specific training algorithms, such as a Bayesian algorithm, a decision tree algorithm (a regression decision tree), a support vector machine algorithm, or a neural network algorithm. Using the above algorithms, a segmentation point classifier can be generated. The various training algorithms described above are only variations of specific implementations without departing from the core of the application, and thus are included in the scope of the present disclosure.

The accuracies of predicted values generated by the various training algorithms described above are different. The segmentation point classifier in the embodiments of the present disclosure is characterized by performing pattern recognition on an image. A convolutional neural network is an efficient identification algorithm that is widely used in fields such as pattern recognition, image processing etc., in recent years, and has characteristics such as having a simple structure, fewer training parameters and a strong adaptability, etc. In particular, the convolutional neural network is used such that an image is allowed to be directly inputted to the network, thereby avoiding a complicated feature extraction and a data reconstruction in conventional recognition algorithms.

Figure 7:
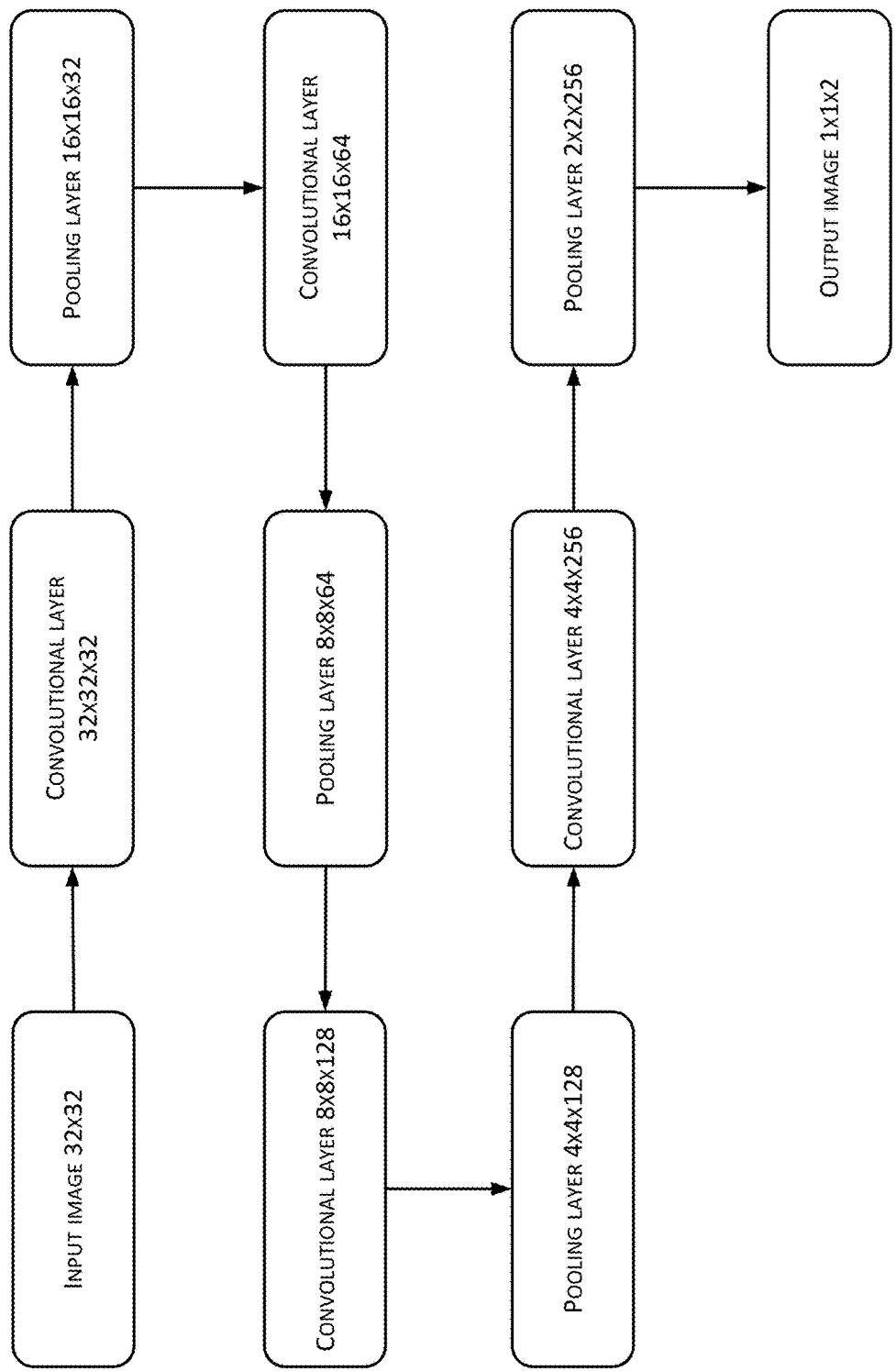
FIG. 7 is a schematic structural diagram of a predetermined convolutional neural network model of an exemplary character segmentation method of the present disclosure.

In implementations, the machine learning algorithm uses a convolutional neural network algorithm. FIG. 7 is a schematic structural diagram of a predetermined convolutional neural network model 700 of the character segmentation method according to an embodiment of the present disclosure. The model includes an input layer, four convolution layers (hidden layers), and an output layer. Each convolution layer includes a plurality of planes. A neuron of each plane extracts local features of a specific region in an image, for example, edge features and directional features. Neurons in a same plane share a weight vector. Weights of neurons in the convolution layers are constantly revised during training. In fact, the convolution layers can be viewed as a fuzzy filter (also known as a convolution kernel), with roles of extracting quadratic features, namely, enhanced image features, and reducing noise. A number of planes in different convolution layers are gradually increased for detecting more feature information. Each convolution layer is followed by a Pooling layer, and the Pooling layer performs sub-sampling calculations to reduce a spatial resolution of the image while preserving useful information, thereby reducing a data throughput.

In implementations, specific parameters of the predetermined convolutional neural network model are as follows:

1) Input Layer

A size of an input image is a resolution of 32×32, and so the number of nodes in an input layer can be designed to be 1024, which correspond to pixels in a 32×32 image window that is expanded by rows.

2) Hidden Layer

Hidden layers have four layers. A number of filters of a first convolution layer is set to be 32 (which corresponds to 32 number of planes). A number of filters of a second convolution layer is set to be 64 (corresponding to 64 number of planes). A number of filters of a third convolution layer is set to be 128 (corresponding to 128 number of planes). A number of filters of a fourth convolution layer is set to be 256 (corresponding to 256 number of planes).

3) Output Layer

Since the convolutional neural network model is used as a classifier with a class number of 2 (which includes correct segmentation points and incorrect segmentation points), a number of nodes in an output layer is therefore 2. Two vector elements of the output layer are actually a probability that the input image includes correct segmentation point(s) and a probability that the input image includes incorrect segmentation point(s). A sum of the vector elements of the output layer is 1.

It should be noted that all weight values should be initialized with a few different small random numbers before training is started. The "small random numbers" are used to ensure that the network will not enter into a saturated state because the weights are too large, which leads to a failure in training. "Different" is used to ensure that the network can learn normally. In fact, if a same number is used to initialize a weight matrix, the network is not capable of learning.

Specifically, learning the segmentation point classifier from the training set through the machine learning algorithm includes: 1) traversing each piece of training data in the training set, using historical foreground character images included in the training data as input images of a predetermined convolutional neural network model, calculating and obtaining outputs of the predetermined convolutional neural network model as prediction results of each piece of the training data; 2) calculating a sum of square of differences between the prediction results of each piece of the training data and the actual results as an error of a current iteration of the training set; 3) determining whether the error of the current iteration is smaller than an error of a previous iteration; adjusting a matrix of the predetermined convolutional neural network model according to a predetermined learning rate and returning to the operation of traversing each piece of training data in the training set to continue the training, if affirmative; using an adjusted convolutional neural network model as the segmentation point classifier if not.

1) Each piece of training data in the training set is traversed. Historical foreground character images included in the training data are used as input images of a predetermined convolutional neural network model. Outputs of the predetermined convolutional neural network model are calculated and obtained as prediction results of pieces of the training data.

Each piece of training data is selected from the training set one by one. A historical foreground character image included in the selected piece of training data is inputted to a predetermined convolutional neural network model, and corresponding output data is calculated and obtained, i.e., a probability that the piece of training data includes correct segmentation point(s) and a probability that the piece of training data includes incorrect segmentation point(s). A classification corresponding to the maximum of these two probabilities is taken as a prediction result of that piece of training data. For example, if a probability that a piece of training data includes a correct segmentation point is 85% and a probability a piece of training data includes an incorrect segmentation point is 15%, a classification of the piece of training data is including a correct segmentation point.

This operation is essentially a forward propagation phase of the convolutional neural network. Information from the input layer is transformed level by level, and is transmitted to the output layer. This process is also a process to be performed when the network is normally running after the training is completed.

2) A sum of square of differences between the prediction results of each piece of the training data and the actual results is calculated as an error of a current iteration of the training set.

After obtaining the prediction result of each piece of training data in the previous operation, this operation calculates a sum of squares of differences between the prediction result and the actual result of each training data as a total error generated in one iteration.

3) A determination is made as to whether the error of the current iteration is smaller than an error of a previous iteration. If affirmative, a matrix of the predetermined convolutional neural network model is adjusted according to a predetermined learning rate and the operation of traversing each piece of training data in the training set is returned to continue the training. If not, an adjusted convolutional neural network model is used as the segmentation point classifier.

The embodiments of the present disclosure adjust a weight matrix according to a method of minimizing an error. In this operation, a determination is made as to whether the training process is completed according to a current iteration error and a previous iteration error. If the current iteration error is less than the previous iteration error, this indicates that the network may be further optimized. As such, the weight matrix of the predetermined weight convolutional neural network is adjusted according to a predetermined learning rate, and the operation 1 is returned to start the next training cycle. If the current iteration error is greater than or equal to the previous iteration error, this indicates that the training target is reached, and the adjusted convolutional neural network model is used as a final segmentation point classifier. After the training is completed, each weight and each threshold parameter need to be saved in a file so that parameters are directly exported from the file to start the training when the training is performed again, without the need of initializing the parameters again.

The operation 2 and the operation 3 are essentially a back propagation phase of the convolutional neural network. The work of these two stages is generally controlled by precision requirements. The above three operations are a training cycle. Many training cycles, often a few hundreds, are needed to complete the training of the convolutional neural network model. The convolutional neural network model that is obtained after the training is completed is a model that is found from the training set, which describes a transformation rule of response variables (i.e., output variables) in the training set under an influence of prediction variables (i.e., input variables).

A most basic algorithm to adjust various parameters in a convolutional neural network model is an error feedback method. Currently, newer algorithms include a gradient algorithm, a Newton-like algorithm, a Levenberg-Marquardt algorithm and a genetic algorithm, etc. Different approaches of the optimization algorithms as described above are merely variations of specific implementations, without departing from the core of the present disclosure, and are all therefore included in the scope of protection of the present disclosure.

The learning rate described in the embodiments of the present disclosure determines an amount of change in parameters generated during each iteration of the training process. A large learning rate can lead to system instability. A small learning rate leads to a longer training time, having a slow convergence, but ensure that training objectives are met. Therefore, under normal circumstances, a smaller learning rate is tended to be chosen to ensure the stability of the system. A selection range for the learning rate is between 0.01-0.8.

In practice, in order to get a more accurate model, for a complex network such as a convolutional neural network model, different learning rates may be needed in different parts of an error curve. In order to reduce a number of times of training and a training time to find a learning rate, a more appropriate method is to adopt a changeable adaptive learning rate, so that different learning rates are set at different stages of training for a network. In implementations, an initial learning rate is set to be 0.01. This value is reduced by 10 times when an error curve during training no longer falls. When this value is reduced to 1e-4, the training is stopped, and a final segmentation point classifier is obtained.

As can be seen from the above analysis, a convolutional neural network model is essentially an input-to-output mapping which can learn a large number of mappings between inputs and outputs without the need of any precise mathematical representation between the inputs and the outputs. As long as the convolutional network is trained using known patterns, the network has the ability of mapping between inputs and outputs.

After the segmentation point classifier is generated, S103 may be performed to select correct segmentation points from al the candidate segmentation points according to the original grayscale character image and the pre-generated segmentation point classifier.

Figure 8:
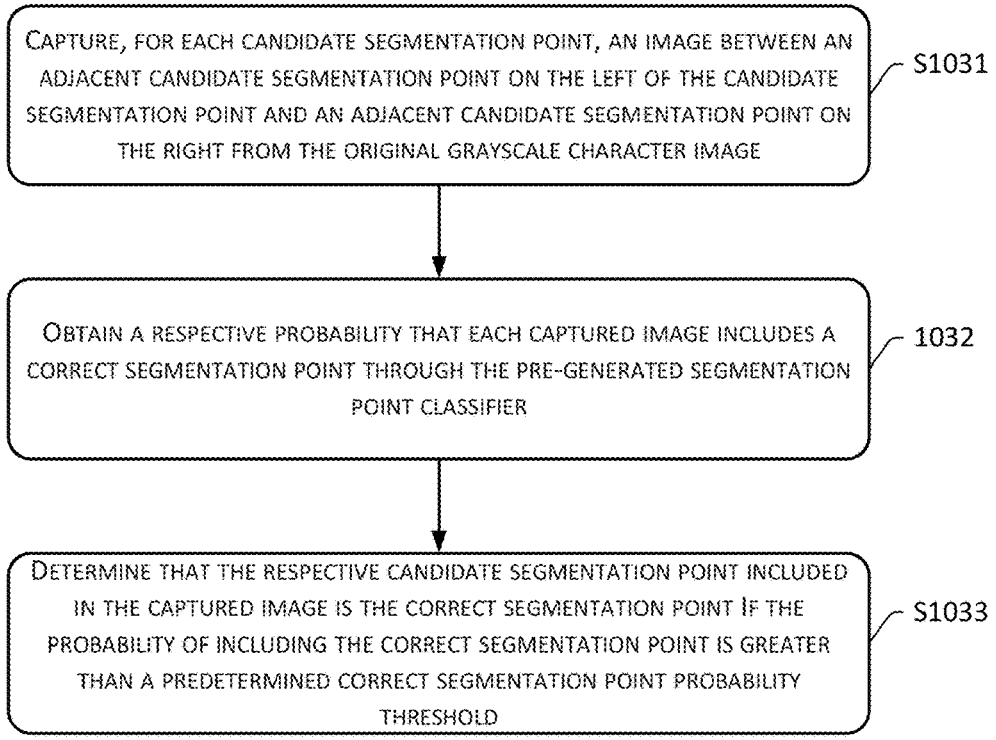
FIG. 8 is a flowchart of an operation S103 of an exemplary character segmentation method of the present disclosure.

FIG. 8 is a flowchart of the operation S103 of the character segmentation method according to the present disclosure. In implementations, S103 includes:

S1031 captures, for each candidate segmentation point, an image between an adjacent candidate segmentation point on the left of the candidate segmentation point and an adjacent candidate segmentation point on the right from the original grayscale character image.

The character segmentation method provided in the embodiments of the present disclosure needs to perform filtering for each candidate segmentation point. Therefore, each candidate segmentation point is selected from all the candidate segmentation points one by one. For each candidate segmentation point, an image located between an adjacent (previous) candidate segmentation point on the left of the candidate segmentation point and an adjacent (next) candidate segmentation point on the right of the candidate segmentation point is captured from the original grayscale character image.

S1032 obtains a respective probability that each captured image includes a correct segmentation point through the pre-generated segmentation point classifier.

For each candidate segmentation point, a corresponding captured image is inputted into the pre-generated segmentation point classifier, and a probability of including a correct segmentation point in the image and a probability of including an incorrect segmentation point in the image are calculated.

S1033 determines that the respective candidate segmentation point included in the captured image is the correct segmentation point If the probability of including the correct segmentation point is greater than a predetermined correct segmentation point probability threshold.

Generally, a classification corresponding to the maximum of the two probabilities obtained at S1032 is taken as a classification of the respective candidate segmentation point. In practical applications, in order to control a classification result more finely, a correct segmentation point probability threshold can also be predetermined. Only when the probability of including a correct segmentation point obtained by the classifier is greater than the predetermined correct segmentation point probability threshold, the candidate segmentation point included in the captured image can be determined to be the correct segmentation point. In implementations, the correct segmentation point probability threshold is empirically set to be 0.9. In other words, if a probability of including a correct segmentation point that is obtained by the segmentation point classifier is greater than 90%, an associated input image is determined to include a correct segmentation point.

Because the segmentation point classifier that is generated by training may have errors and may not predict classifications of input images well, candidate segmentation points may further be classified in order to improve the accuracy of classification of the segmentation points.

Figure 9:
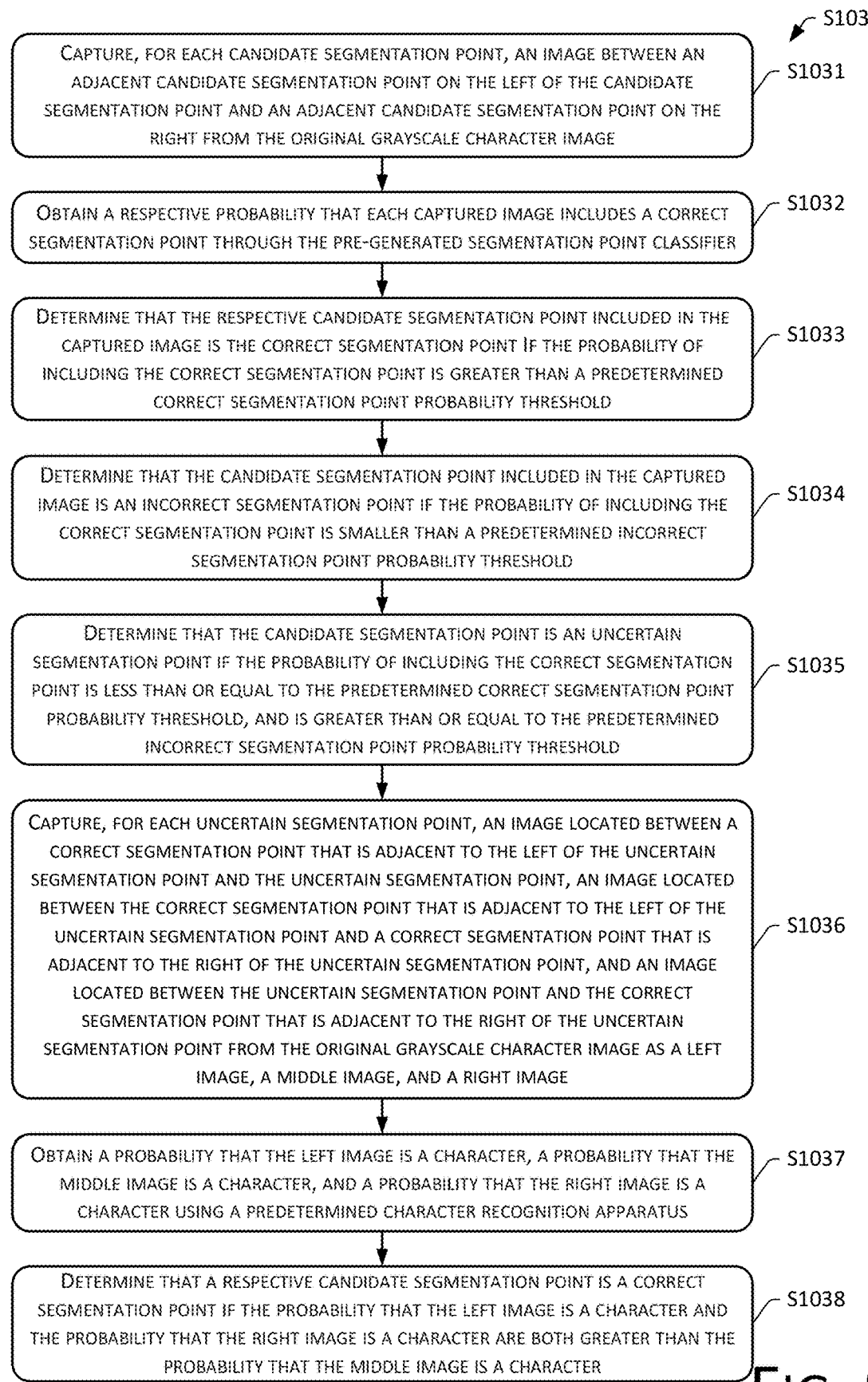
FIG. 9 is another flowchart of an operation S103 of an exemplary character segmentation method of the present disclosure.

FIG. 9 is another flowchart of the operation S103 of the character segmentation method in the present disclosure. As can be seen from FIG. 9, after operations S1031-S1033, the method further includes:

S1034 determines that the candidate segmentation point included in the captured image is an incorrect segmentation point if the probability of including the correct segmentation point is smaller than a predetermined incorrect segmentation point probability threshold.

Relative to the predetermined correct segmentation point probability threshold at S1033, S1034 further adds a predetermined incorrect segmentation point probability threshold.

In other words, by using a predetermined correct segmentation point probability threshold and a predetermined incorrect segmentation point probability threshold, a more refined classification of candidate segmentation points is performed.

In implementations, the correct segmentation point probability threshold is empirically set to be 0.9, and the incorrect segmentation point probability threshold is set to be 0.1. In other words, if a probability of including a correct segmentation point obtained by the segmentation point classifier is greater than 90%, an associated input image is found to include a correct segmentation point. If the probability of including the correct segmentation point obtained by the segmentation point classifier is less than 10%, the input image is found to include an incorrect segmentation point.

S1035 determines that the candidate segmentation point is an uncertain segmentation point if the probability of including the correct segmentation point is less than or equal to the predetermined correct segmentation point probability threshold, and is greater than or equal to the predetermined incorrect segmentation point probability threshold.

In implementations, candidate segmentation points are classified into three types: a correct segmentation point, an incorrect segmentation point, and an uncertain segmentation point. If a probability of including a correct segmentation point obtained by the segmentation point classifier is less than or equal to the predetermined correct segmentation point probability threshold and is greater than or equal to the predetermined incorrect segmentation point probability threshold, an associated candidate segmentation point is determined as an uncertain segmentation point, i.e., the candidate segmentation point may be correct or incorrect, and a further identification is needed.

S1036 captures, for each uncertain segmentation point, an image located between a correct segmentation point that is adjacent to the left of the uncertain segmentation point and the uncertain segmentation point, an image located between the correct segmentation point that is adjacent to the left of the uncertain segmentation point and a correct segmentation point that is adjacent to the right of the uncertain segmentation point, and an image located between the uncertain segmentation point and the correct segmentation point that is adjacent to the right of the uncertain segmentation point from the original grayscale character image as a left image, a middle image, and a right image.

For a candidate segmentation point that is determined to be an uncertain segmentation point, an image located between a correct segmentation point that is adjacent to the left (previous) of the uncertain segmentation point and the uncertain segmentation point, an image located between the correct segmentation point that is adjacent to the left of the uncertain segmentation point and a correct segmentation point that is adjacent to the right (next) of the uncertain segmentation point, and an image located between the uncertain segmentation point and the correct segmentation point that is adjacent to the right of the uncertain segmentation point are needed to be captured from the original grayscale character image as a left image, a middle image, and a right image respectively.

S1037 obtains a probability that the left image is a character, a probability that the middle image is a character, and a probability that the right image is a character using a predetermined character recognition apparatus.

The predetermined character recognition apparatus in the embodiments of the present disclosure refers to an apparatus capable of recognizing whether a given character image is a standard character in a standard character library. For example, if a given character image is a standard character in the standard character library, the standard character corresponding to the character image can be obtained by the character recognition apparatus. If the given character image is not a standard character in the standard character library, the character image cannot be recognized by the character recognition apparatus.

S1037 performs character recognition on the left image, the middle image and the right image that are respectively captured at S1036 using a predetermined character recognition apparatus to obtain a probability that the left image is a standard character, a probability that the middle image is a standard character, and a probability that the right image is a standard character.

S1038 determines that a respective candidate segmentation point is a correct segmentation point if the probability that the left image is a character and the probability that the right image is a character are both greater than the probability that the middle image is a character.

If a probability that a left image is a standard character and a probability that a right image is a standard character are both greater than a probability that a middle image is a standard character, this means that the middle image needs to be segmented into the left image and the right image, and an uncertain candidate segmentation point is therefore determined as a correct segmentation point. On the contrary, if the probability that the left image is a standard character and the probability that the right image is a standard character are both smaller than the probability that the middle image is a standard character, this means that the middle image needs not be segmented. Therefore, a determination is made that the uncertain candidate segmentation point is an incorrect segmentation point. At this point, all correct segmentation points in the candidate segmentation points are obtained.

S105 performs character segmentation on the character image to be segmented according to the correct segmentation points.

Finally, character segmentation is performed on the character image to be segmented according to all the correct segmentation points that are selected at S103 above.

Figure 10:
FIG. 10 is a schematic diagram of a segmentation process of an exemplary character segmentation method of the present disclosure.

FIG. 10 is a schematic diagram of a process of segmenting a character according to an embodiment of the present disclosure. In FIG. 10, a sub-figure a is a binary character image. A sub-figure b is all candidate segmentation points that are obtained through a segmentation point generation algorithm. A sub-figure c is a segmentation point that is obtained after filtering by a division point classifier. A sub-figure d is a segmentation point after processing by a character recognition engine. A sub-figure e is a final character segmentation result. As can be seen, using a segmentation point classifier or the segmentation point classifier in combination with a character recognition engine, the character image to be segmented can be avoided from being overly segmented, thus improving the accuracy of character segmentation.

In practice, in order to enhance a visual effect of a character image, the character image may include irregular characters. For example, characters in the image are inclined characters. In this case, before the character image is segmented, character correction may also need to be performed on inclined characters therein.

Therefore, in implementations, prior to S101, the method further includes: performing inclined character correction on the character image to be segmented, and generating an inclined-character-corrected character image to be segmented.

Figure 11:
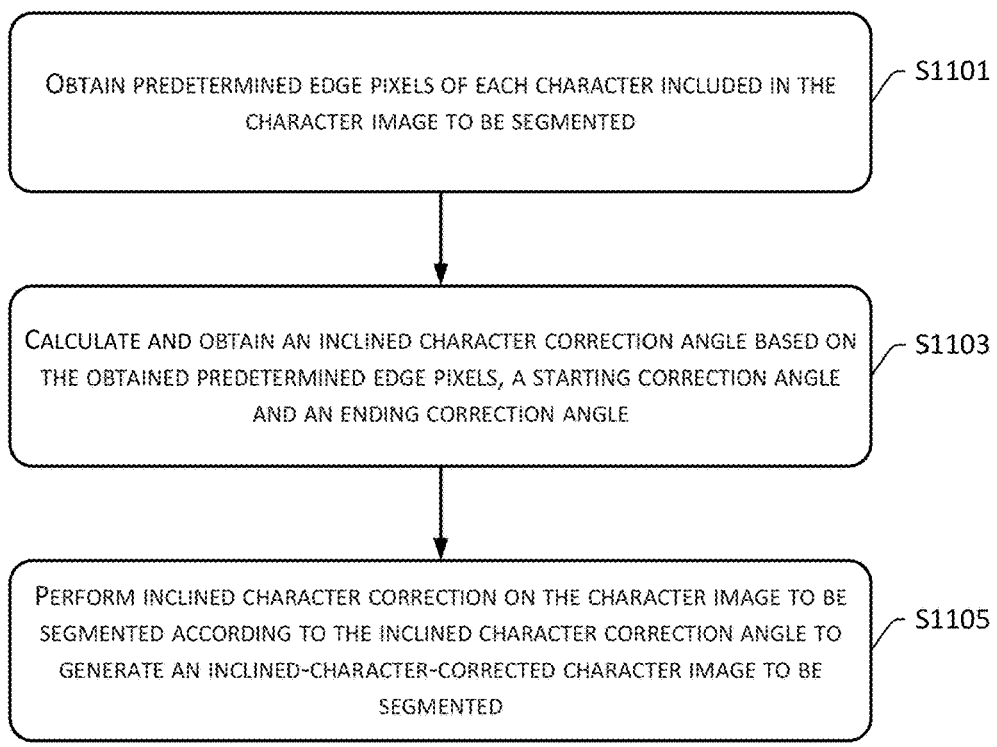
FIG. 11 is a flowchart of an inclined character correction processing of an exemplary character segmentation method of the present disclosure.

FIG. 11 is a flowchart of inclined character correction processing 1100 of the character segmentation method in accordance with an embodiment of the present disclosure. In implementations, performing the inclined character correction on the character image to be segmented to generate the inclined-character-corrected character image to be segmented includes:

S1101 obtains predetermined edge pixels of each character included in the character image to be segmented.

Predetermined edge pixels as described in the embodiments of the present disclosure include left edge pixels or right edge pixels. For example, if a pixel value of a pixel is less than a pixel value of a left adjacent (previous) pixel thereof (i.e., p(i,j)<255), and the left adjacent pixel is white in color (i.e., p(i−1, j)=255), that pixel is a left edge pixel of a character to which that pixel belongs. If a pixel value of a pixel is smaller than a pixel value of a right adjacent (next) pixel (i.e., p(i,j)<255), and the right adjacent pixel is white in color (i.e., p(i+1, j)=255), that pixel is a right edge pixel of a character to which that pixel belongs.

It should be noted that the predetermined edge pixels may further include left edge pixels and right edge pixels at the same time. An advantage of using such predetermined edge pixels is that an effect of inclined character correction can be improved. A disadvantage is that an amount of calculation is doubled as compared to simply including left edge pixels or right edge pixels. In practical applications, any one of the predetermined edge pixels may be selected according to specific requirements. The variety of different predetermined edge pixels as described above are merely variations of specific implementations without departing from the core of the present disclosure, and are all therefore included in the scope of protection of the present disclosure.

At S1101, each pixel in the character image to be segmented needs to be determined to obtain all predetermined edge pixels of each character included therein.

S1103 calculates and obtains an inclined character correction angle based on the obtained predetermined edge pixels, a starting correction angle and an ending correction angle.

The starting correction angle and the ending correction angle described in the embodiments of the present disclosure refer to an angular range, in which an inclined character correction angle is located, i.e., an inclined angle of an inclined character is usually between the starting correction angle and the ending correction angle. Specifically, the starting correction angle and the ending correction angle are determined according to an empirical value. In implementations, the starting correction angle is set to be −30 degrees and the ending correction angle to be 30 degrees. A negative correction angle indicates that an inclined character is tilted to the right, and a leftward correction is needed. A positive correction angle indicates that an inclined character is tilted to the left, and a rightward correction is needed.

In implementations, S1103 adopts the following approach: calculating a respective information entropy of each angle of inclination between the starting correction angle and the ending correction angle according to the obtained predetermined edge pixels, and selecting an angle of inclination corresponding to an information entropy being ranked at the lowest position as an inclined character correction angle.

An information entropy of an angle of inclination described in the embodiments of the present disclosure indicates the uncertainty of the angle of inclination. The larger the information entropy is, the greater the uncertainty is. Therefore, an angle of inclination corresponding to an information entropy at the lower position has a higher degree of certainty, and can be used as a final inclined character correction angle.

After finding respective predetermined edge pixels of all the characters, each angle between a respective starting correction angle and a respective ending correction angle is traversed. An information entropy of each angle is calculated according to the obtained predetermined edge pixels, and an angle corresponding to an information entropy at a low position is taken as an inclined character correction angle.

Figure 12:
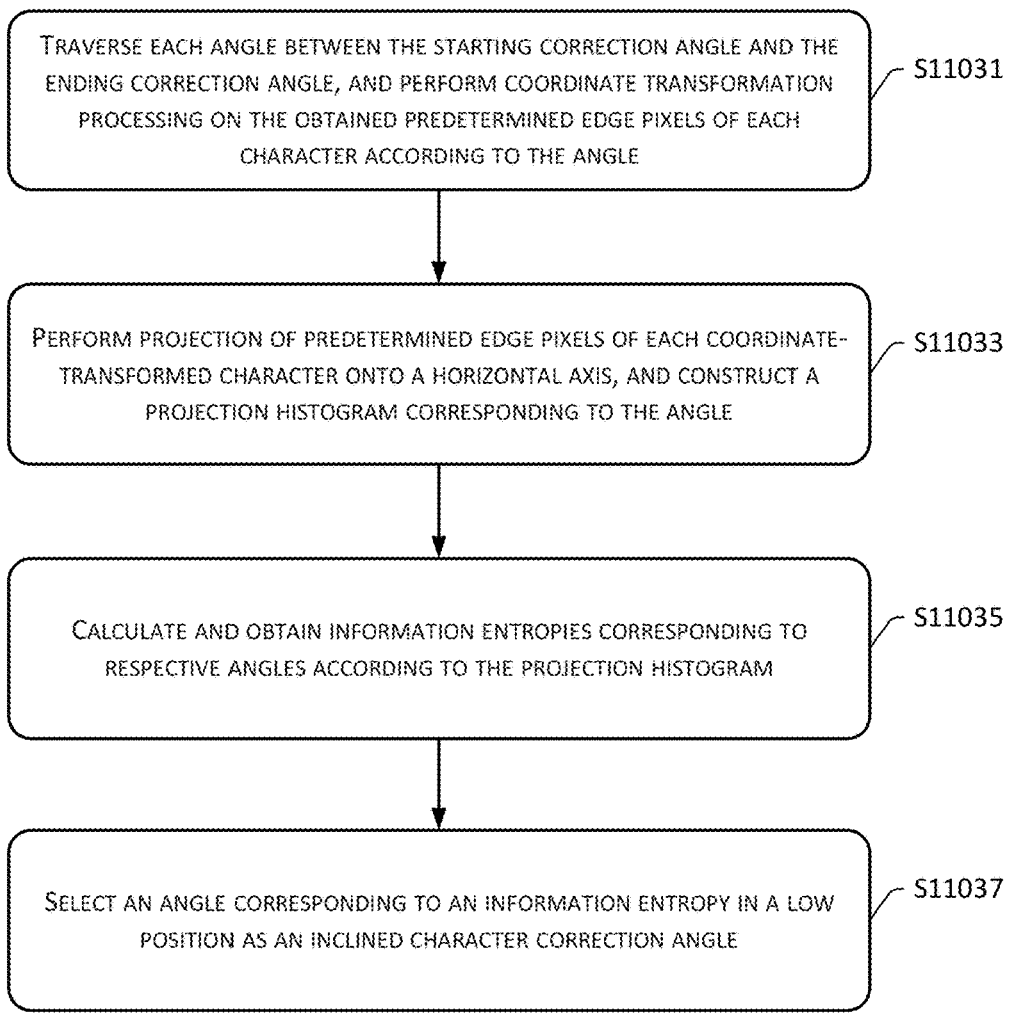
FIG. 12 is a flowchart of an operation S1103 of an exemplary character segmentation method of the present disclosure.

FIG. 12 is a flowchart of the operation S1103 of the character segmentation method according to the present disclosure. Specifically, obtaining the inclined character correction angle according to the obtained predetermined edge pixels, the predetermined starting correction angle, and the ending correction angle includes the following operations:

S11031 traverses each angle between the starting correction angle and the ending correction angle, and performs coordinate transformation processing on the obtained predetermined edge pixels of each character according to the angle.

For each angle between the starting correction angle and the ending correction angle, coordinate transformation processing needs to be performed first on each of the obtained predetermined edge pixels according to a currently traversed angle, i.e., performing inclined character correction on predetermined edge pixels of each character.

In implementations, a coordinate transformation is performed on predetermined edge pixels of each obtained character based on a selected angle by using the following formula:

$$p(i,j) \rightarrow p(i-j \cdot \tan \theta, j)$$

In the above formula, p(i,j) is a pixel to be transformed. i−j·tan θ is a horizontal coordinate of a pixel position to which the pixel to be transformed is moved.

S11033 performs projection of predetermined edge pixels of each coordinate-transformed character onto a horizontal axis, and constructs a projection histogram corresponding to the angle.

For each angle between a starting correction angle and an ending correction angle, a predetermined edge pixel of each character is projected onto a horizontal axis after coordinate transformation according to a coordinate transformation result of the predetermined edge pixel at the respective angle, and a projection histogram corresponding to the respective angle is constructed.

S11035 calculates and obtains information entropies corresponding to respective angles according to the projection histogram.

A character recognition method provided by the embodiments of the present disclosure calculates an information entropy of each angle using the following formula:

$$H(\theta) = -\sum_{i=1}^{M} \frac{h_i}{N} \log \frac{h_i}{N}$$

M is a number of columns of a projection histogram. N is a total number of predetermined edge pixels of all characters. $h_i$ is a number of pixels that are projected onto an $i^{th}$ column.

S11037 selects an angle corresponding to an information entropy in a low position as an inclined character correction angle.

Since an information entropy of an angle of inclination indicates the uncertainty of the angle of inclination, the larger the information entropy is, the greater the uncertainty is. Therefore, an angle of inclination corresponding to an information entropy at a low level is taken as a final inclined character correction angle. In implementations, an angle of inclination corresponding to the smallest entropy is selected as the final inclined character correction angle.

S1105 performs inclined character correction on the character image to be segmented according to the inclined character correction angle to generate an inclined-character-corrected character image to be segmented.

After obtaining the inclined character correction angle at S1103, the inclined character correction may be performed on the character image to be segmented according to the obtained inclined character correction angle to generate an inclined-character-corrected character image to be segmented. Specifically, coordinate transformation needs to be performed on each of foreground pixel (which pixel value is smaller than a pixel of 255) of the character to be segmented based on the inclined character correction angle. The coordinate transformed is performed using the following formula: $p(i,j) \rightarrow p(i-j \cdot \tan \theta, j)$. $p(i,j)$ represents a pixel to be translated, and $i-j \cdot \tan \theta$ is a horizontal coordinate of a pixel position to which the pixel to be transformed is moved.

In the above embodiments, a character segmentation method is provided. Correspondingly, the present disclosure also provides a character segmentation apparatus. The apparatus corresponds to the embodiments of the method described above.

Figure 13:
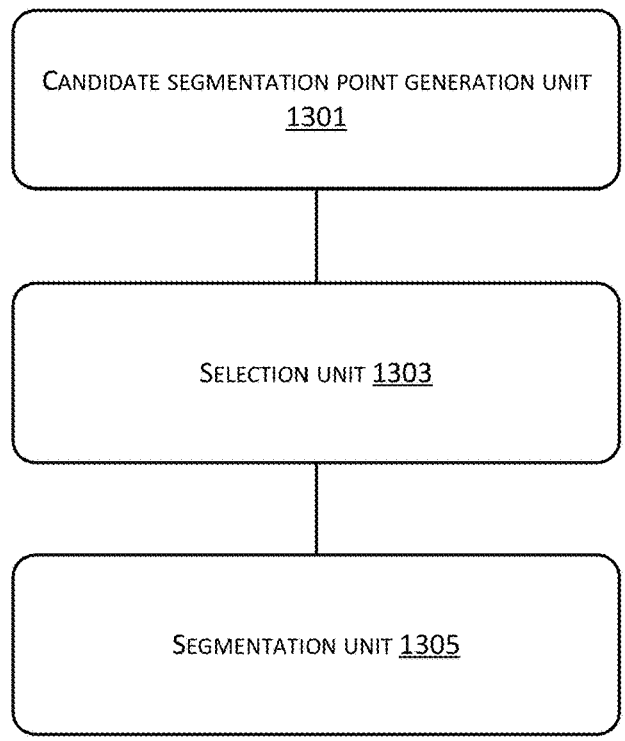
FIG. 13 is a schematic diagram of an exemplary character segmentation apparatus of the present disclosure.

FIG. 13 is a schematic diagram of an exemplary character segmentation apparatus 1300 according to the present disclosure. Since the apparatus embodiments are basically similar to the method embodiment, a description thereof is relatively simple. Related parts can be referenced may to respective portions of the description of the method embodiments. The apparatus embodiments described herein are merely illustrative.

The present exemplary character segmentation apparatus 1300 includes a candidate segmentation point generation unit 1301 used for obtaining character segmentation points of a character image to be segmented as candidate segmentation points using a predetermined segmentation point generation algorithm, the character image to be segmented being a foreground character image that is obtained by removing a background image from an original grayscale character image; a selection unit 1303 used for selecting and obtaining correct segmentation points from the candidate segmentation points based on the original grayscale character image and a pre-generated segmentation point classifier; and a segmentation unit 1305 used for performing character segmentation for the character image to be segmented based on the correct segmentation points.

Figure 14:
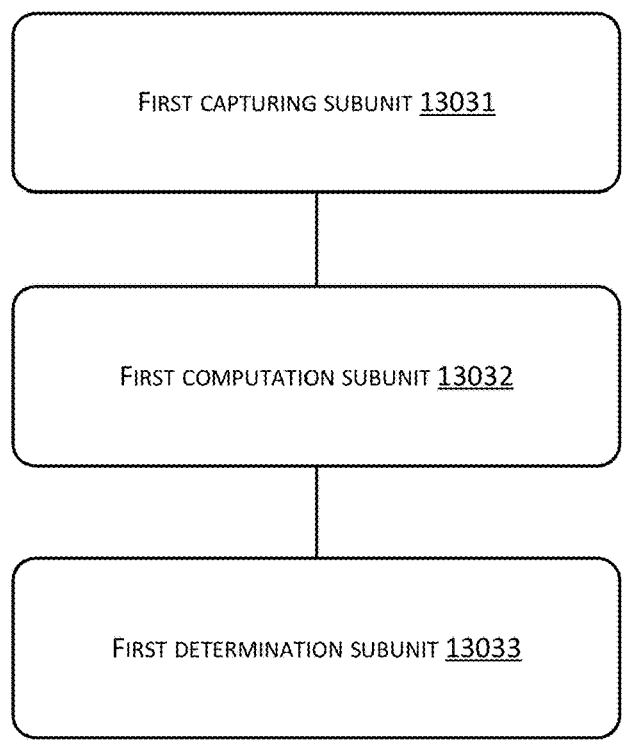
FIG. 14 is a schematic diagram of a selection unit 1303 of an exemplary character segmentation apparatus of the present disclosure.

FIG. 14 is a schematic diagram of the selection unit 1303 of the character segmentation apparatus in accordance with an embodiment of the present disclosure. In implementations, the selection unit 1303 includes a first capturing subunit 13031 used for capturing a respective image located between a left adjacent candidate segmentation point and a right adjacent candidate segmentation point of a candidate segmentation point from the original grayscale character image for each candidate segmentation point; a first computation subunit 13032 used for obtaining a probability of including a correct segmentation point in the respective captured image using the pre-generated segmentation point classifier; a first determination subunit 13033 used for determining that the candidate segmentation point included in the respective captured image is a correct segmentation point if the probability of including the correct segmentation point is greater than a predetermined correct segmentation point probability threshold value.

Figure 15:
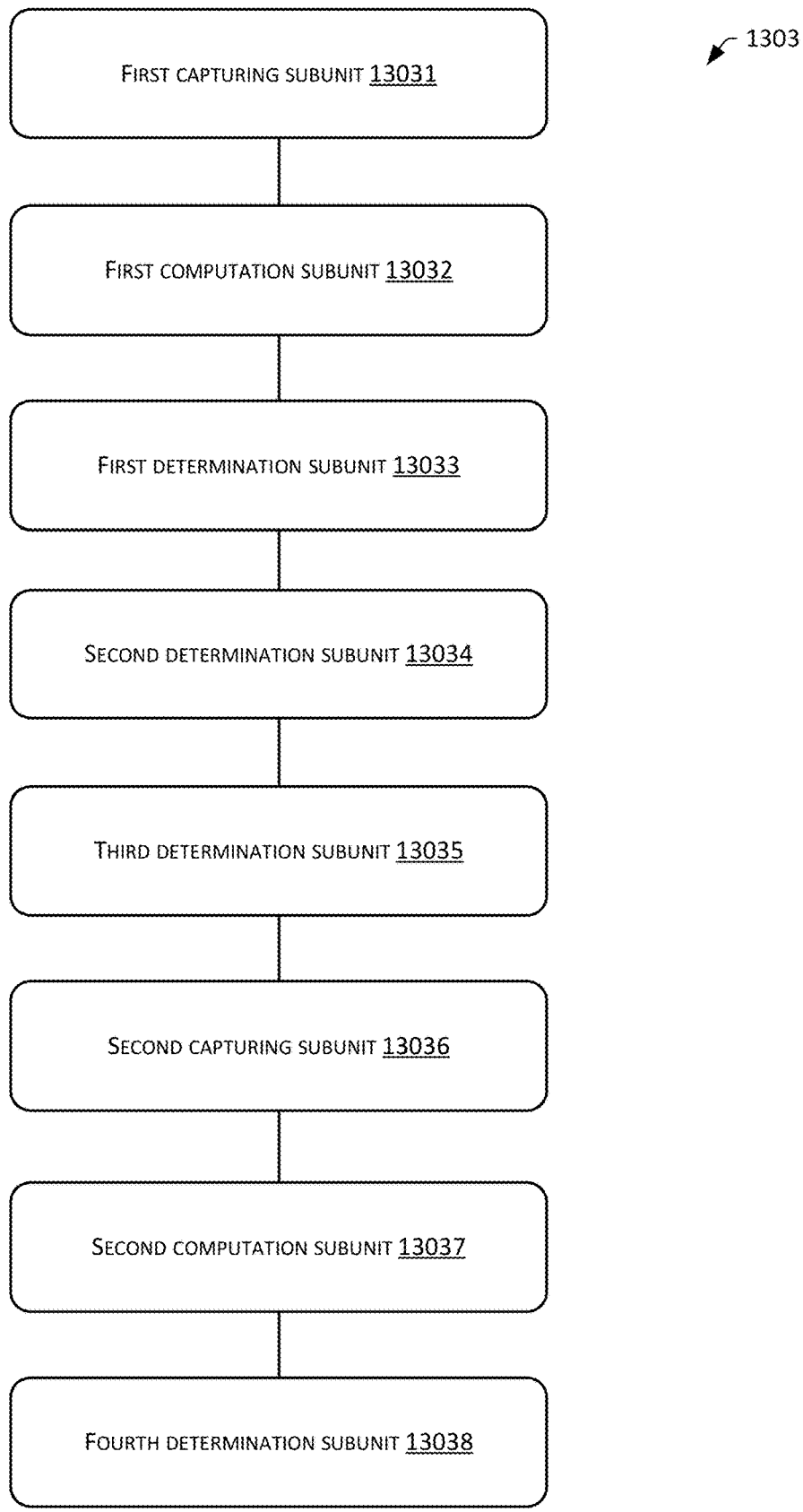
FIG. 15 is another schematic diagram of a selection unit 1303 of an exemplary character segmentation apparatus of the present disclosure.

FIG. 15 is another schematic diagram of the selection unit 1303 of the character segmentation apparatus in accordance with an embodiment of the present disclosure. In implementations, the selection unit 1303 further includes a second determination subunit 13034 used for determining that the candidate segmentation point included in the respective captured image is an incorrect segmentation point if the probability of including the correct segmentation point is less than a predetermined incorrect segmentation point probability threshold value; a third determination subunit 13035 used for determining that the candidate segmentation point included in the respective captured image is an uncertain segmentation point if the probability of including the correct segmentation point is less than or equal to the predetermined correct segmentation point probability threshold value and greater than or equal to the predetermined incorrect segmentation point probability threshold value; a second capturing subunit 13036 used for, for each uncertain segmentation point, capturing an image located between a correct segmentation point that is adjacent to the left of the uncertain segmentation point and the uncertain segmentation point, an image located between the correct segmentation point that is adjacent to the left of the uncertain segmentation point and a correct segmentation point that is adjacent to the right of the uncertain segmentation point, and an image located between the uncertain segmentation point and the correct segmentation point that is adjacent to the right of the uncertain segmentation point as a left image, a middle image, and a right image from the original grayscale character image respectively; a second computation subunit 13037 used for obtaining a probability of the left image as a character, a probability of the middle image as a character, and a probability of the right image as a character using a predetermined character recognition apparatus; and a fourth determination subunit 13038 used for determining that the uncertain candidate segmentation point is a correct segmentation point if the probability of the left image as a character and the probability of the right image as a character are both greater than the probability of the middle image as a character.

Figure 16:
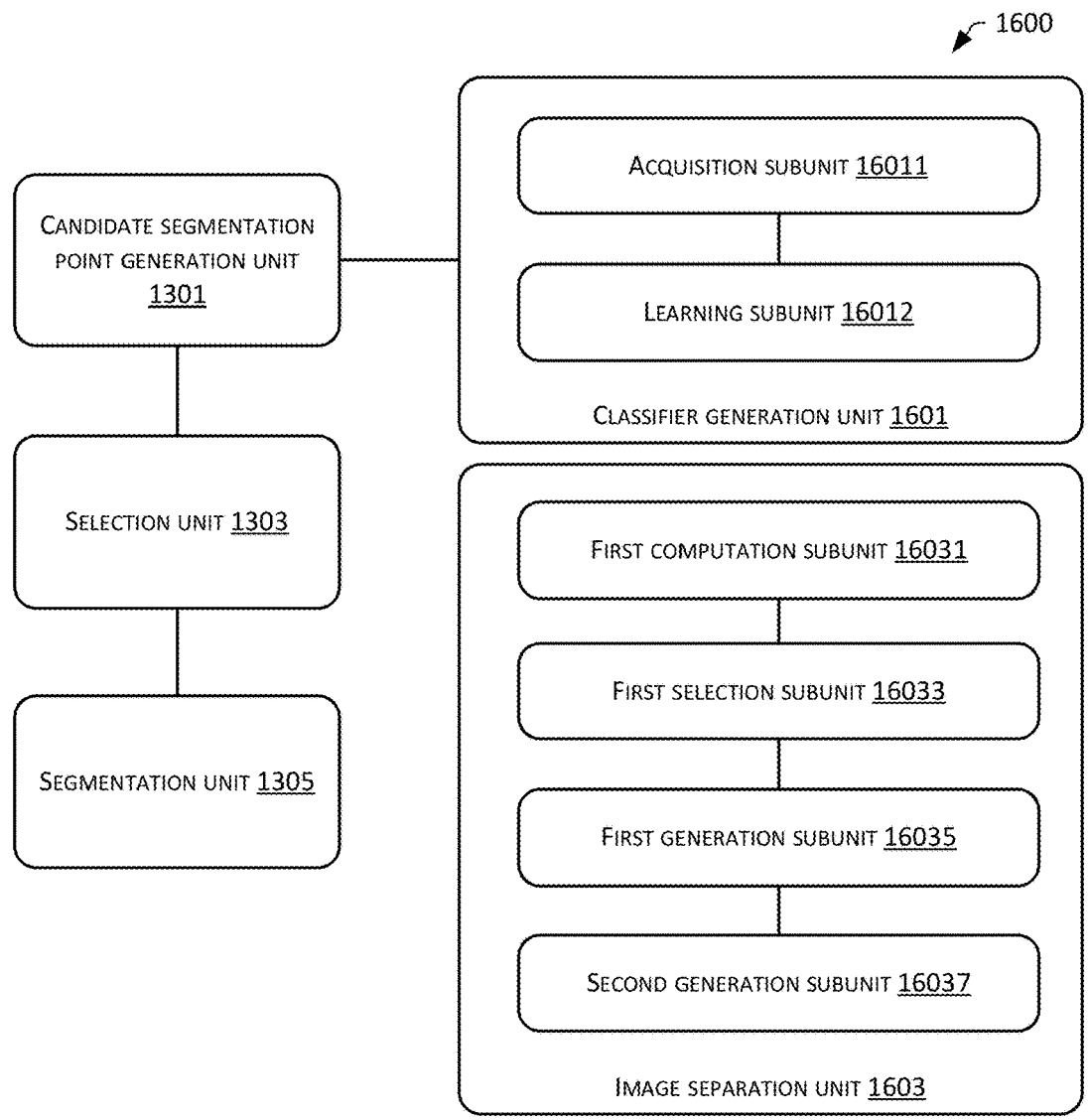
FIG. 16 is a schematic diagram of an exemplary character segmentation apparatus of the present disclosure.

FIG. 16 is a schematic diagram of the character segmentation apparatus 1600 in accordance with an embodiment of the present disclosure. In implementations, the apparatus 1600 further includes a classifier generation unit 1601 used for generating the pre-generated segmentation point classifier.

In implementations, the classifier generation unit 1601 includes an acquisition subunit 16011 used for obtaining a training set that is formed by vector pairs of historical foreground character images and respective actual results of whether a correct segmentation point is included; and a learning subunit 16013 used for obtaining the pre-generated segmentation point classifier by learning through a machine learning algorithm.

In implementations, the machine learning algorithm uses a convolutional neural network algorithm. The learning subunit 16013 includes a first computation unit used for traversing training data in the training set, taking historical foreground character images included in the training data as input images of a predetermined convolutional neural network model, and computing and obtaining outputs of the predetermined convolutional neural network model as prediction results of the training data; a second computation subunit used for calculating a squared sum of differences between the prediction results of the training data and the actual results as an error of a current iteration of the training set; a determination subunit used for determining whether the error of the current iteration is less than an error of a previous iteration, adjusting a weight matrix of the predetermined convolutional neural network model based on a predetermined training rate and returning to the operation of traversing training data in the training set to continue the training if affirmative; and setting an adjusted convolutional neural network model as the segmentation point classifier if not.

In implementations, the apparatus further includes an image separation unit 1603 used for performing image separation processing on the original grayscale character image to generate the character image to be segmented.

In implementations, performing the image separation processing on the original grayscale character image to generate the character image to be segmented uses the following approach: performing binarization processing the original grayscale character image to generate a binary character image as the character image to be segmented.

In implementations, the image separation unit 1603 comprises:

In implementations, the image separation unit 1603 includes a first computation subunit 16031 used for obtaining pixel values of foreground pixels of the original grayscale character image through a global binarization algorithm; a first selection subunit 16033 used for setting pixels having pixel values in the original grayscale character image that are less than a first pixel threshold value as first foreground pixels; a first generation subunit 16035 used for setting an image formed by the first foreground pixels as a first foreground image; and a second generation subunit 16037 used for binarizing the first foreground image through a local binarization algorithm, and separating and obtaining the binary character image from the first foregoing image.

In implementations, the first computation subunit 16031 includes a computation subunit used for individually taking various pixel values in the original grayscale character image as candidate pixel threshold values, and calculating an inter-class variance between background images and foreground images that are obtained by separation using the candidate pixel threshold values; and a selection subunit used for selecting a candidate pixel threshold corresponding to a high rank in the inter-class variance as a pixel threshold value for the foreground pixels of the original grayscale character image.

In implementations, the second generation subunit 16037 includes a first computation subunit used for separately calculating average pixel values and pixel value variances for respective sub-images having a predetermined size and the pixels as respective centers; a second computation subunit used for calculating and obtaining respective pixel threshold values of the foreground image corresponding to the pixels as respective second threshold values based on the average pixel values and the pixel value variances separately corresponding to the pixels; a determination subunit used for individually determining whether a pixel value of each pixel is less than a corresponding second threshold value, setting the pixel value of the pixel as a black color if affirmative, and setting the pixel value of the pixel as a white color if not; and a setting subunit used for taking the first foreground image after a pixel value update as the binary character image.

In implementations, the apparatus further includes an inclined character correction unit 1605 used for performing an inclined character correction processing on the character image to be segmented to generate an inclined-letter-corrected character image to be segmented.

In implementations, the inclined character correction unit 1605 includes an acquisition subunit 16051 used for obtaining predetermined edge pixels of characters included in the character image to be segmented; a computation subunit 16053 used for calculating and obtaining an angle of inclined character correction based on the obtained predetermined edge pixels, a predetermined starting correction angle and a predetermined ending correction angle; a correction subunit 16055 used for performing the inclined character correction on the character image to be segmented based on the angle of inclined character correction to generate the inclined-letter-corrected character image to be segmented.

Figure 17:
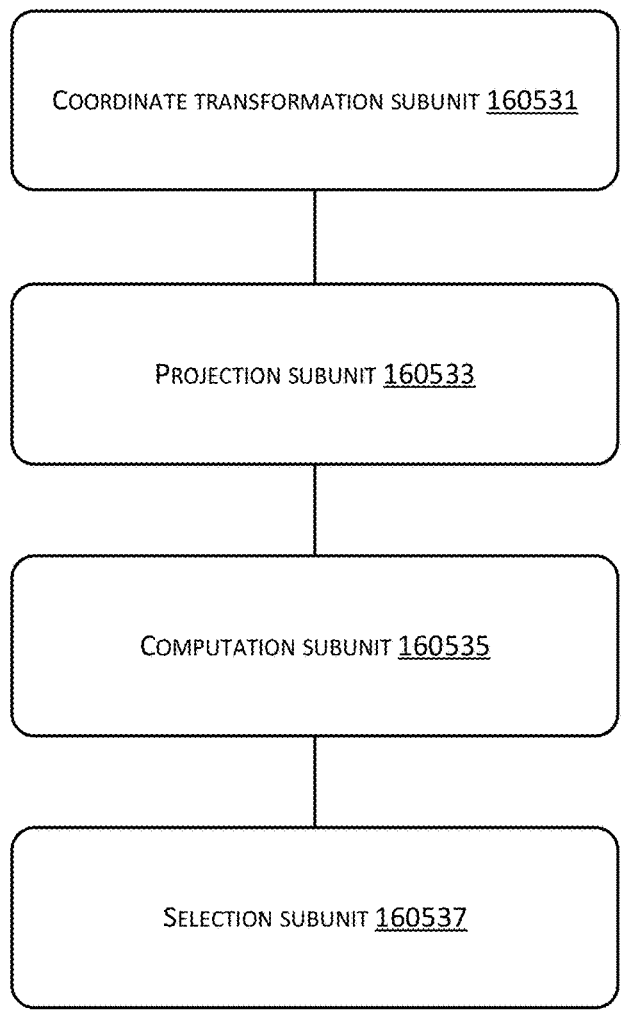
FIG. 17 is a schematic diagram of a computation subunit 16053 of an exemplary character segmentation apparatus of the present disclosure.

FIG. 17 is a schematic diagram of the computation subunit 16053 of the character segmentation apparatus in accordance with an embodiment of the present disclosure. In implementations, the computation subunit 16053 includes a coordinate transformation subunit 160531 used for traversing various angles between predetermined starting correction angle and the predetermined ending correction angle, and performing coordinate transformation on the obtained predetermined edge pixels of the characters based on the angles; a projection unit 160533 used for projecting the predetermined edge pixels of the characters after the coordinate transformation on a horizontal axis, and constructing a projection histogram corresponding to the angles; a computation subunit 160535 used for calculating and obtaining information entropies corresponding to the various angles based on the projection histogram; and a selection subunit 160537 used for selecting an angle corresponding to an information entropy at a low position as the angle of inclined character correction.

In implementations, the predetermined segmentation point generation algorithm adopts a projection based character segmentation method. The candidate segmentation point generation unit 1301 includes a projection subunit used for projecting pixels in the character image to be segmented onto a horizontal axis, and constructing a projection histogram; a determination subunit used for treating a respective column as a character segmentation point of the character image to be segmented if a number of pixels of a left adjacent column is greater than a number of pixels of the respective column and a number of pixels of a right adjacent column is greater than the number of pixels of the respective column for each column in the projection histogram, and if the number of pixels of the left adjacent column is greater than the number of pixels of the respective column, numbers of pixels of more than one right adjacent column are greater than the number of pixel of the respective column, and a number of pixel of a right adjacent column of a rightmost column of the more than one right adjacent column is greater than a number of pixel of the rightmost column, treating a column located in the middle between the respective column and the right adjacent column of the rightmost column as the character segmentation point of the character image to be segmented.

Figure 18:
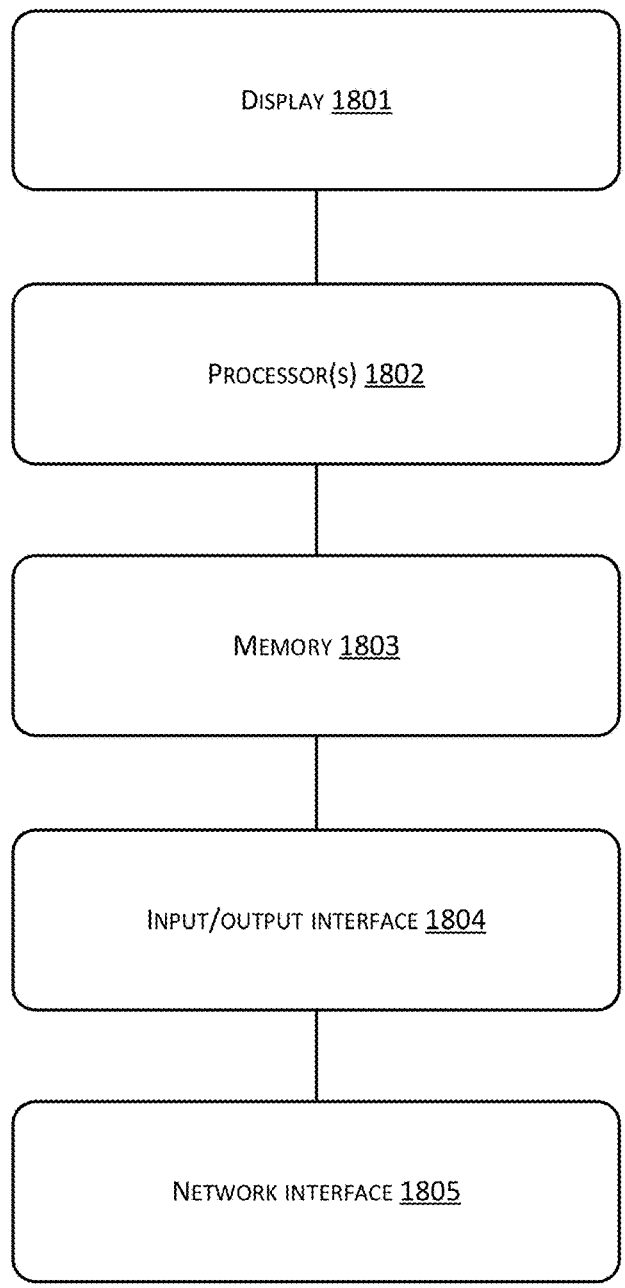
FIG. 18 is a schematic diagram of an exemplary electronic device of the present disclosure.

FIG. 18 is a schematic diagram of an electronic device 1800 in accordance with an embodiment of the present disclosure. Since the device embodiment is substantially similar to the method embodiments, a description thereof is relatively simple. Related portions can be referenced to respective portions of the description of the method embodiments. The device embodiment described herein is merely illustrative.

An electronic device (e.g., a character segmentation device) according to the present embodiment, the electronic device including a display 1801, processor(s) 1802, and memory 1803, the memory 1803 being configured to store a character segmentation apparatus, and the character segmentation apparatus that, when executed by the processor(s) 1802, performs the following operations: obtaining character segmentation points of a character image to be segmented as candidate segmentation points using a predetermined segmentation point generation algorithm, the character image to be segmented being a foreground character image that is obtained by removing a background image from an original grayscale character image; selecting and obtaining correct segmentation points from the candidate segmentation points based on the original grayscale character image and a pre-generated segmentation point classifier; and performing character segmentation for the character image to be segmented based on the correct segmentation points. In implementations, the electronic device 1800 may further include an input/output interface 1804 and a network interface 1805.

A character recognition system in accordance with the embodiments of the present disclosure includes any one of the above character segmentation apparatus.

The character segmentation method, apparatus and electronic device provided by the present disclosure obtain character segmentation points of a character image to be segmented as candidate segmentation points using a predetermined segmentation point generation algorithm, wherein the character image to be segmented is a foreground character image that is obtained by removing a background image from an original grayscale character image; select and obtain correct segmentation points from the candidate segmentation points based on the original grayscale character image and a pre-generated segmentation point classifier; and finally perform character segmentation for the character image to be segmented based on the correct segmentation points. This can filter candidate segmentation points using an original grayscale character image, and correct segmentation points, thus avoiding overly segmentation of a character image having phenomena such as character breaking or character blurring, and thereby achieving an effect of improvement on the accuracy of character segmentation.

The present disclosure also provides an image separating method, basic ideas of the core thereof is to perform binarization on a grayscale image using a combination of a global binarization algorithm and a local adaptive binarization algorithm to separate and obtain a background image and a foreground image. Because the global binarization algorithm is capable of extracting a clearer foreground image, while the local adaptive binarization algorithm can eliminate noise points that exist in a background image, the foreground image that is obtained has a more optimized effect.

Figure 19:
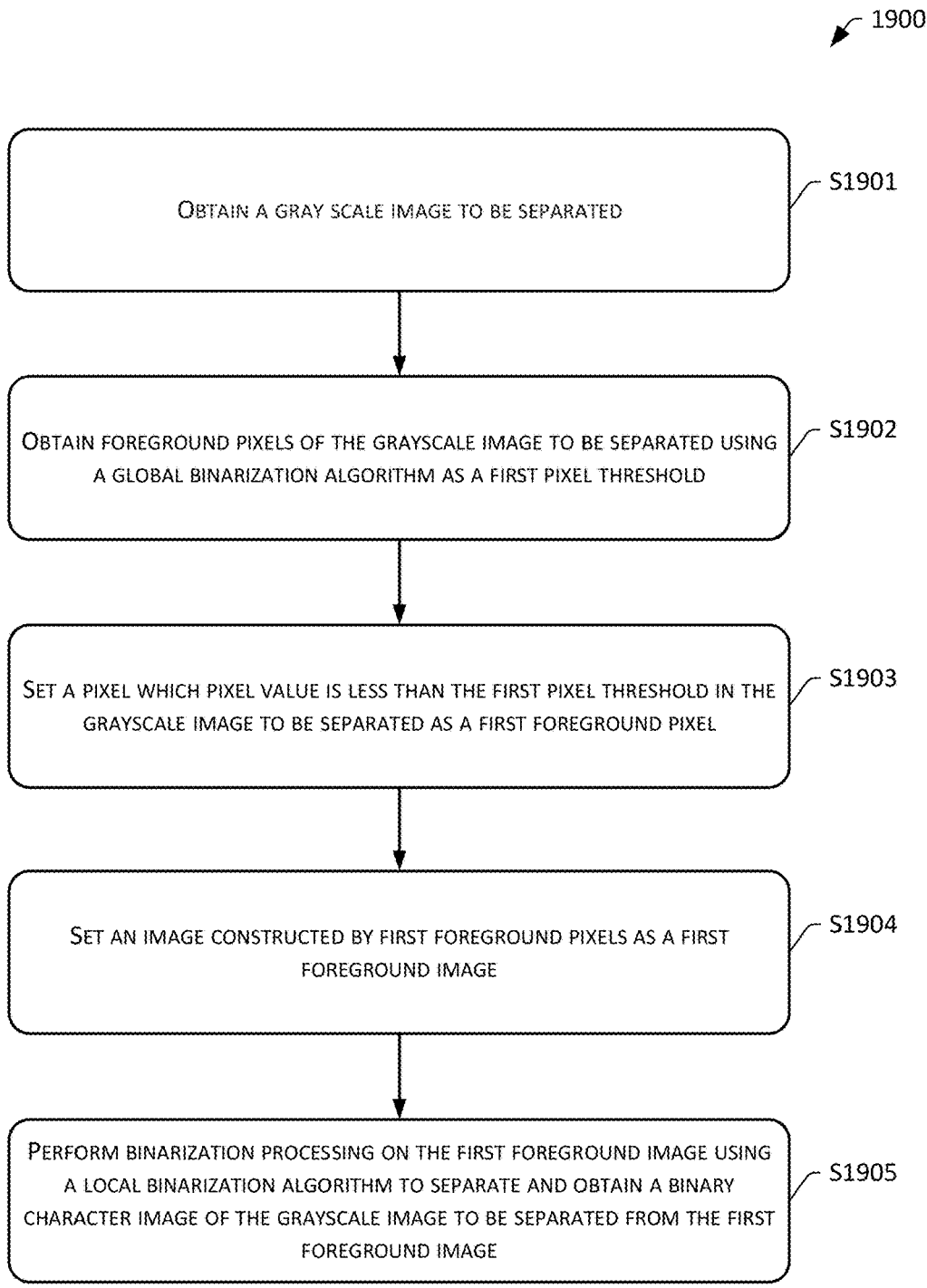
FIG. 19 is a flowchart of an exemplary image segmentation method of the present disclosure.

FIG. 19 is a flowchart of an image separation method 1900 provided by an embodiment of the present disclosure. Portions of the present embodiment that are the same as the content of the first embodiment are not repeatedly described, and can be referenced to corresponding portions of the first embodiment. The image separation method 1900 provided by the present disclosure includes:

S1901 obtains a gray scale image to be separated.

A grayscale image to be separated that is described in the embodiments of the present disclosure corresponds to an original grayscale character image of the first embodiment, except that the grayscale image to be separated can be any grayscale image, i.e., a grayscale image to be separated may or may not include a character image.

S1902 obtains foreground pixels of the grayscale image to be separated using a global binarization algorithm as a first pixel threshold.

S1902 corresponds to S201 of the first embodiment. Same portions are not repeatedly described herein, and respective portions of S201 can be referenced for related description.

In implementations, obtaining the foreground pixels of the grayscale image to be separated using the global binarization algorithm as the first pixel threshold includes:

S19021 individually takes each pixel value in the grayscale image to be separated as a candidate pixel threshold, and calculates respective inter-class variances between background images and foreground images that are separated and obtained based on the candidate pixel thresholds.

In implementations, an inter-class variance is calculated using the following formula:

$$\sigma^2 = \omega_0 \cdot (\mu_0 - \mu)^2 + \omega_1 \cdot (\mu_1 - \mu)^2$$

$\sigma^2$ is the inter-class variance. $\mu$ is an average pixel value of the grayscale image to be separated. $\omega_0$ is a ratio between the number of pixels of the foreground image and the number of pixels of the grayscale image to be separated. $\omega_1$ is a ratio between the number of pixels of the background image and a number of pixels of the grayscale image to be separated. $\mu_0$ is an average pixel value of the foreground image. $\mu_1$ is an average pixel value of the background image. $\mu = \omega_0 \mu_0 + \omega_1 \mu_1$, $\omega_0 / (M*N)$. $\omega_1 = N_1 / (M*N)$. M and N are width and height of the grayscale image to be separated. M*N is the number of pixels included in the grayscale image. $N_0$ is the number of pixels of the foreground image. $N_1$ is the number of pixels of the background image.

S19021 corresponds to S2011 of the first embodiment. Same portions are not repeatedly described herein, and respective portions of S2011 can be referenced for related description.

S19023 elects a candidate pixel threshold corresponding to an inter-class variance that is in a high position as a pixel threshold of foreground pixels of the grayscale image to be separated.

S19023 corresponds to S2013 of the first embodiment. Same portions are not repeatedly described herein, and respective portions of S2013 can be referenced for related description.

S1903 sets a pixel which pixel value is less than the first pixel threshold in the grayscale image to be separated as a first foreground pixel.

S1903 corresponds to S203 of the first embodiment. Same portions are not repeatedly described herein, and respective portions of S203 can be referenced for related description.

S1904 sets an image constructed by first foreground pixels as a first foreground image.

S1904 corresponds to S205 of the first embodiment. Same portions are not repeatedly described herein, and respective portions of S205 can be referenced for related description.

S1905 performs binarization processing on the first foreground image using a local binarization algorithm to separate and obtain a binary character image of the grayscale image to be separated from the first foreground image.

S1905 corresponds to S207 of the first embodiment. Same portions are not repeatedly described herein, and respective portions of S207 can be referenced for related description.

In implementations, performing binarization processing on the first foreground image using the local binarization algorithm to separate and obtain the binary character image from the first foreground image includes:

S19051 respectively calculates, for each pixel in the first foreground image, an average pixel value and a variance of pixel values of a sub-image that has a predetermined size and is centered on the respective pixel.

In implementations, calculating and obtaining the second pixel threshold of the foreground pixel respectively corresponding to each of the pixels based on the respective average pixel value and the respective pixel value variance corresponding to each of the pixels adopts the following formula:

$$T(i,j)=m(i,j)+k\cdot\sigma(i,j)$$

$T(i,j)$ is a second pixel threshold value corresponding to a pixel at $i^{th}$ row and $j^{th}$ column in the first foreground image. $m(i,j)$ is an average pixel value corresponding to a pixel at $i^{th}$ row and $j^{th}$ column in the first foreground image. $\sigma(i,j)$ is a pixel variance corresponding to a pixel at $i^{th}$ row and $j^{th}$ column in the first foreground image. k is a variance factor.

In implementations, the predetermined size of the sub-image includes a square.

S19051 corresponds to S2071 of the first embodiment. Same portions are not repeatedly described herein, and respective portions of S2071 can be referenced for related description.

S19053 calculates and obtains a pixel threshold of a foreground pixel corresponding to each pixel as a second pixel threshold, based on the average pixel value and the pixel value variance corresponding to each pixel.

S19053 corresponds to S2073 of the first embodiment. Same portions are not repeatedly described herein, and respective portions of S2073 can be referenced for related description.

S19055 determines whether a pixel value of each pixel is less than a second pixel threshold corresponding thereto sequentially, and sets the pixel value of the respective pixel as black in color if affirmative, or sets the pixel value of the respective pixel to white in color if not.

S19055 corresponds to S2075 of the first embodiment. Same portions are not repeatedly described herein, and respective portions of S2075 can be referenced for related description.

S19057 takes the first foreground image after the pixel values are updated as the binary image.

S19057 corresponds to S2077 of the first embodiment. Same portions are not repeatedly described herein, and respective portions of S2077 can be referenced for related description.

In the above embodiments, an image separation method is provided. Corresponding thereto, the present disclosure also provides an image separation apparatus. The apparatus corresponds to the embodiments of the foregoing method.

Figure 20:
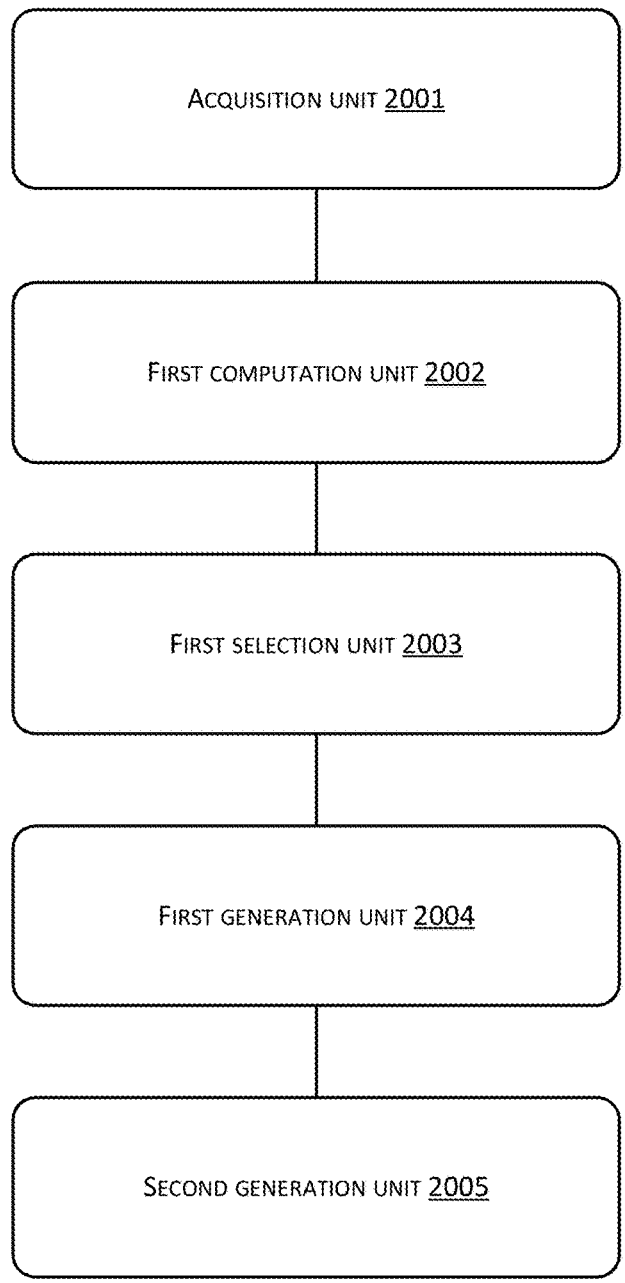
FIG. 20 is a schematic diagram of an exemplary image segmentation apparatus of the present disclosure.

FIG. 20 is a schematic diagram of an image separation apparatus 2000 in accordance with an embodiment of the present disclosure. Since the apparatus embodiment is substantially similar to the method embodiments, a description thereof is relatively simple. Related parts can be referenced to respective portions of the method embodiments. The apparatus described as follows is merely illustrative.

An image separation apparatus 2000 of the present embodiment, includes an acquisition unit 2001 used for obtaining a gray image to be separated; a first computation unit 2002 used for obtaining a pixel threshold value of foreground pixels of the gray image to be separated as a first pixel threshold value through a global binarization algorithm; a first selection unit 2003 used for setting pixels with pixel values less than the first pixel threshold value in the gray image to be separated as first foreground pixels; a first generation unit 2004 used for setting an image formed by the first foreground pixels as a first foreground image; and a second generation unit 2005 used for binarizing the first foreground image through a local binarization algorithm, and separating and obtaining a binary image of the gray image to be separated from the first foreground image.

In implementations, the first computation unit 2002 includes a computation subunit used for individually taking various pixel values in the gray image to be separated as candidate pixel threshold values, and calculating an inter-class variance between background images and foreground images that are obtained by separation using the candidate pixel threshold values; and a selection subunit used for selecting a candidate pixel threshold corresponding to a high rank in the inter-class variance as a pixel threshold value for the foreground pixels of the gray image to be separated.

In implementations, the second generation unit 2005 includes a first computation subunit used for, for pixels in the first foreground image, separately calculating average pixel values and pixel value variances for respective sub-images having a predetermined size and the pixels as respective centers; a second computation unit used for calculating and obtaining respective pixel threshold values of the foreground image corresponding to the pixels as respective second threshold values based on the average pixel values and the pixel value variances separately corresponding to the pixels; a determination subunit used for individually determining whether a pixel value of each pixel is less than a corresponding second threshold value, setting the pixel value of the pixel as a black color if affirmative, and setting the pixel value of the pixel as a white color if not; and a setting subunit used for setting the first foreground image after a pixel value update as the binary character image.

Figure 21:
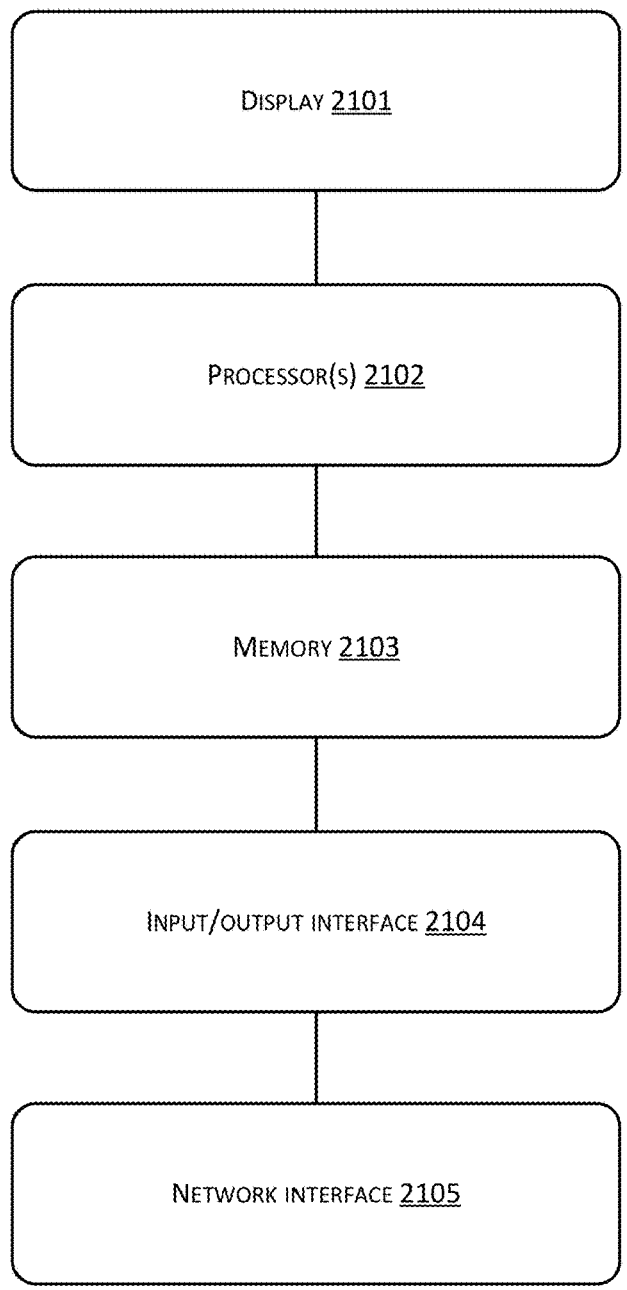
FIG. 21 is a schematic diagram of another exemplary electronic device of the present disclosure.

FIG. 21 is a schematic diagram of another the electronic device 2100 in accordance with an embodiment of the present disclosure. Since the device embodiment is substantially similar to the method embodiments, a description thereof is relatively simple. Related portions can be referenced to respective portions of the description of the method embodiments. The device embodiment described herein is merely illustrative.

Another electronic device (i.e., an image separation device) 2100 according to the present embodiment, the electronic device 2100 including a display 2101, processor(s) 2102, and memory 2103, the memory 2103 being configured to store an image separation apparatus, and the image separation apparatus that, when executed by the processor(s) 2102, performs the following operations: obtaining a gray image to be separated; obtaining a pixel threshold value of foreground pixels of the gray image to be separated as a first pixel threshold value through a global binarization algorithm; setting pixels with pixel values less than the first pixel threshold value in the gray image to be separated as first foreground pixels; setting an image formed by the first foreground pixels as a first foreground image; and binarizing the first foreground image through a local binarization algorithm, and separating and obtaining a binary image of the gray image to be separated from the first foreground image. In implementations, the electronic device 2100 may further include an input/output interface 2104 and a network interface 2105.

A method, an apparatus, and an electronic device for image separation provided by the present disclosure use a combination of a global binarization algorithm and a local adaptive binarization algorithm to perform binarization on a grayscale image to be separated to be separate and obtain a binary image of the grayscale image to be separated, namely, a foreground image. Because the global binarization algorithm is capable of extracting a clearer foreground image, while the local adaptive binarization algorithm can eliminate noise points that exist in a background image, the foreground image that is obtained has a more optimized effect, thus achieving an effect of improvement in the accuracy of image separation.

Figure 22:
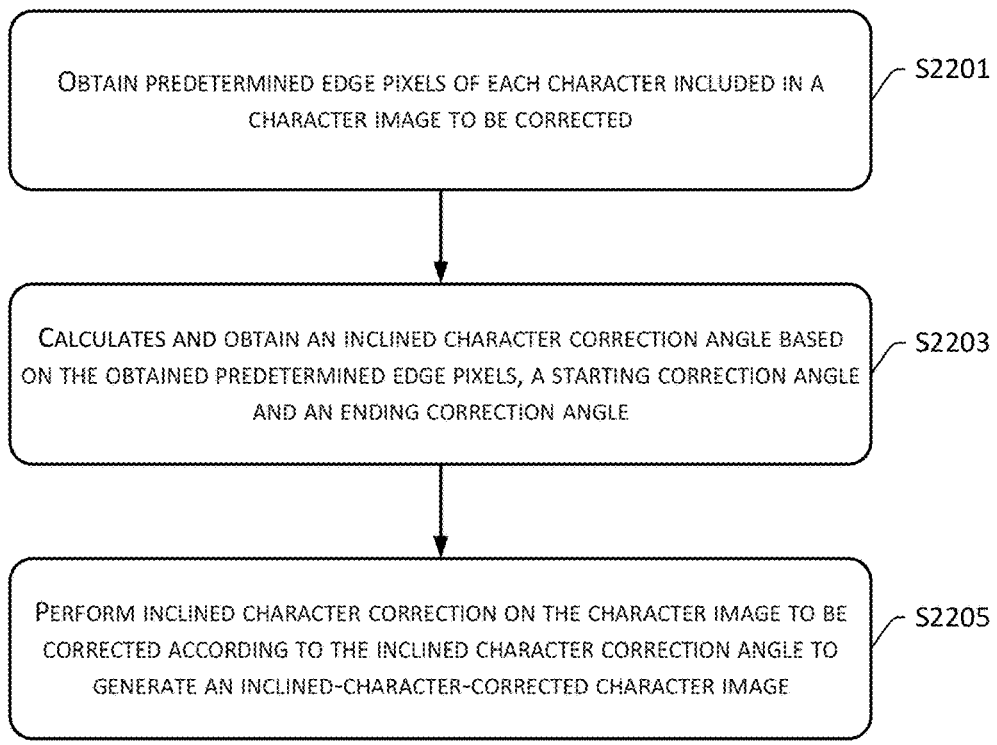
FIG. 22 is a flowchart of an exemplary inclined character correction method of the present disclosure.

The present disclosure further provides an inclined character correction method. FIG. 22 is a flowchart of an inclined character correction method 2200 in accordance with an embodiment of the present disclosure. Portions of the present embodiment that are the same as the content of the first embodiment are not repeatedly described, and can be referenced to corresponding portions of the first embodiment. The inclined character correction method provided by the present disclosure includes:

S2201 obtains predetermined edge pixels of each character included in a character image to be corrected.

A character image to be corrected in the embodiments of the present disclosure corresponds to a character image to be separated in the first embodiment, except that the character image to be corrected may be a color image.

S12201 corresponds to S1101 of the first embodiment. Same portions are not repeatedly described herein, and respective portions of S1101 can be referenced for related description.

Predetermined edge pixels described in the embodiments of the present disclosure include left edge pixels or right edge pixels. In implementations, the predetermined edge pixels are left edge pixel. Obtaining the predetermined edge pixels of each character included in the character image to be corrected is performed using the following approach: setting a pixel as a left edge pixel of the respective character if a pixel value of the pixel is less than a pixel value of a left adjacent pixel and the left adjacent pixel is white in color.

S2203 calculates and obtains an inclined character correction angle based on the obtained predetermined edge pixels, a starting correction angle and an ending correction angle.

S2203 corresponds to S1103 of the first embodiment. Same portions are not repeatedly described herein, and respective portions of S1103 can be referenced for related description.

In implementations, calculating and obtaining the inclined character correction angle based on the obtained predetermined edge pixels, the starting correction angle and the ending correction angle uses the following approach: calculating a respective information entropy of each angle of inclination between the starting correction angle and the ending correction angle according to the obtained predetermined edge pixels, and selecting an angle of inclination corresponding to an information entropy being ranked at a low position as an inclined character correction angle.

In implementations, calculating and obtaining the inclined character correction angle based on the obtained predetermined edge pixels, the starting correction angle and the ending correction angle includes:

S22031 traverses each angle between the starting correction angle and the ending correction angle, and performs coordinate transformation processing on the obtained predetermined edge pixels of each character according to the angle.

S22033 performs projection of predetermined edge pixels of each coordinate-transformed character onto a horizontal axis, and constructs a projection histogram corresponding to the angle.

S22035 calculates and obtains information entropies corresponding to respective angles according to the projection histogram.

S22037 selects an angle corresponding to an information entropy in a low position as an inclined character correction angle.

In implementations, the entropy is calculated using the following formula:

$$H(\theta) = -\sum_{i=1}^{M} \frac{h_i}{N} \log \frac{h_i}{N}$$

M is a number of columns of a projection histogram. N is a total number of predetermined edge pixels of all characters. $h_i$ is a number of pixels that are projected onto an $i^{th}$ column.

S2205 performs inclined character correction on the character image to be corrected according to the inclined character correction angle to generate an inclined-character-corrected character image.

S2205 corresponds to S1105 of the first embodiment. Same portions are not repeatedly described herein, and respective portions of S1105 can be referenced for related description.

In implementations, the following approach is used for performing the inclined character correction on the character image to be corrected according to the inclined character correction angle: performing coordinate transformation on each pixel included in each character of the character image to be corrected according to the inclined character correction angle.

In implementations, the coordinate transformation is performed on the pixels using the following formula:

$$p(i,j) \rightarrow p(i-j \cdot \tan \theta, j)$$

p(i,j) is a pixel to be transformed. i−j·tan θ is a horizontal coordinate of a pixel position to which the pixel to be transformed is moved.

In the above embodiment, an inclined character correction method is provided. Corresponding thereto, the present disclosure also provides an inclined character correction apparatus. The apparatus corresponds to the above method embodiment.

Figure 23:
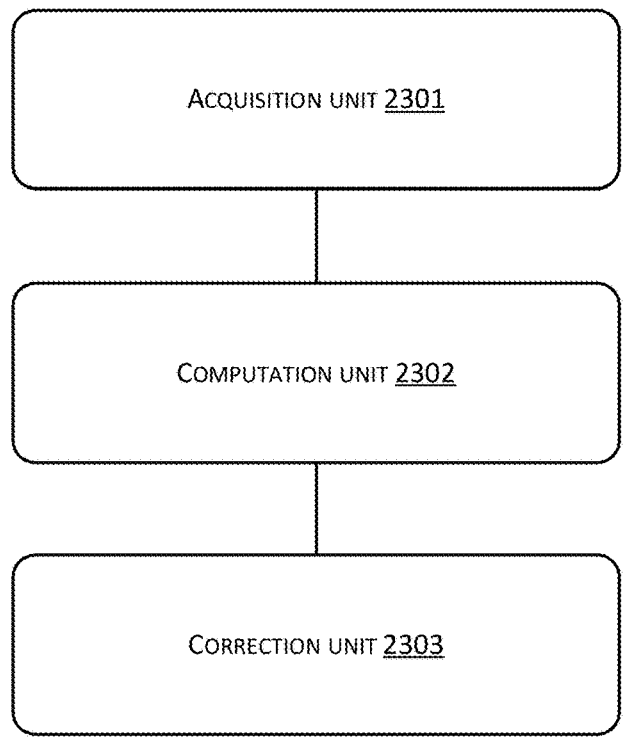
FIG. 23 is a schematic diagram of an exemplary inclined character correction apparatus of the present disclosure.

FIG. 23 is a schematic diagram of an inclined character correction apparatus 2300 in accordance with an embodiment of the present disclosure. Since the apparatus embodiment is substantially similar to the method embodiment, a description thereof is relatively simple. Relevant parts can be referenced to respective portions of the method embodiment can. The apparatus embodiment described hereinafter is merely illustrative.

An inclined character correction apparatus 2300 of the present embodiment, includes an acquisition unit 2301 used for obtaining predetermined edge pixels of characters included in a character image to be corrected; a computation unit 2303 used for calculating and obtaining an angle of inclined character correction based on the obtained predetermined edge pixels, a predetermined starting correction angle and a predetermined ending correction angle; a correction unit 2305 used for performing the inclined character correction on the character image to be corrected based on the angle of inclined character correction to generate an inclined-letter-corrected character image.

In implementations, the computation unit 2303 includes a coordinate transformation subunit used for traversing various angles between the predetermined starting correction angle and the predetermined ending correction angle, and performing coordinate transformation on the obtained predetermined edge pixels of the characters based on the angles; a projection subunit projecting the predetermined edge pixels of the characters after the coordinate transformation on a horizontal axis, and constructing a projection histogram corresponding to the angles; a computation subunit used for calculating and obtaining information entropies corresponding to the various angles based on the projection histogram; and a selection subunit used for selecting an angle corresponding to an information entropy at a low position as the angle of inclined character correction.

Figure 24:
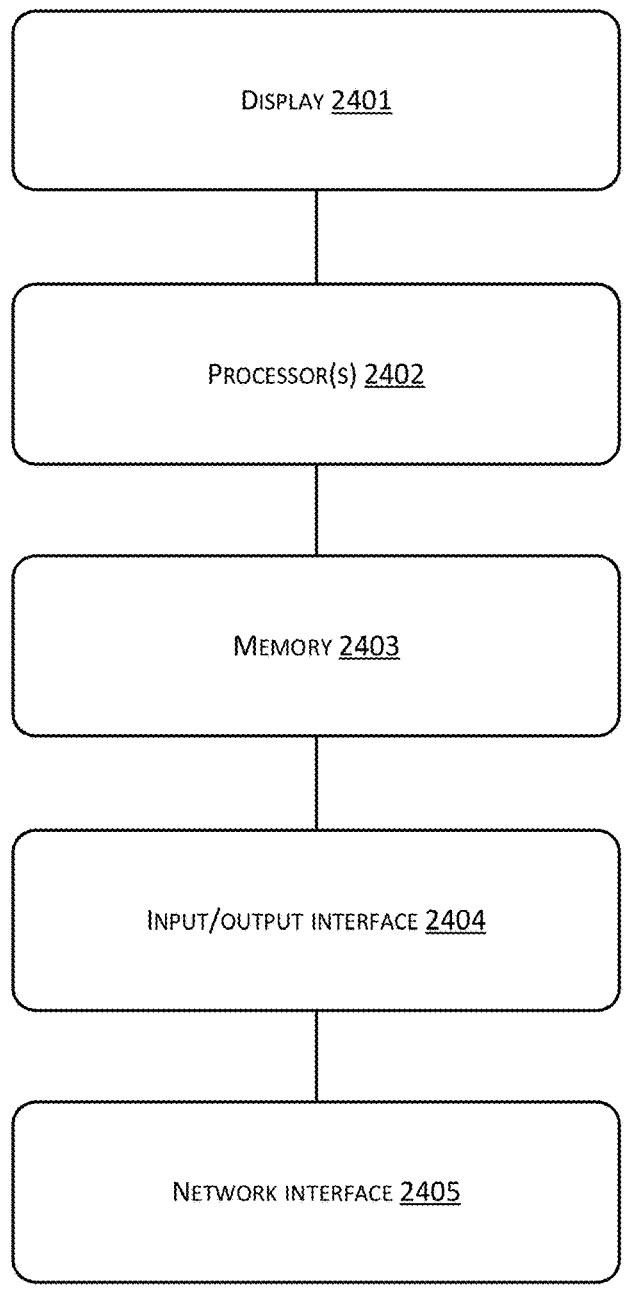
FIG. 24 is a schematic diagram of another exemplary electronic device of the present disclosure.

FIG. 24 is a schematic diagram of still another electronic device in accordance with an embodiment of the present disclosure. Since the device embodiment is substantially similar to the method embodiment, a description thereof is relatively simple. Relevant parts can be referenced to respective portions of the method embodiment can. The device embodiment described hereinafter is merely illustrative.

The still another electronic device (i.e., an inclined character correction device) according to the present embodiment, the electronic device includes a display 2401, processor(s) 2402, and memory 2403, the memory 2403 being configured to store an inclined character correction apparatus, and the inclined character correction apparatus that, when executed by the processor(s) 2402, performs the following operations: obtaining predetermined edge pixels of characters included in a character image to be corrected; calculating and obtaining an angle of inclined character correction based on the obtained predetermined edge pixels, a predetermined starting correction angle and a predetermined ending correction angle; performing the inclined character correction on the character image to be corrected based on the angle of inclined character correction to generate an inclined-letter-corrected character image. In implementations, the electronic device 2400 may further include an input/output interface 2404 and a network interface 2405.

By obtaining predetermined edge pixels of each character included in a character image to be corrected, the inclined character correction method, apparatus and electronic device provided by the present disclosure calculate and obtain an inclined character correction angle based on the obtained predetermined edge pixels, a predetermined starting correction angle and a predetermined ending correction angle, and perform the inclined character correction on the character image to be corrected based on the inclined character correction angle, so that an inclined-letter-corrected character image is generated, thus achieving an effect of improving the accuracy of the inclined character correction.

Although the present disclosure is disclosed above using the above exemplary embodiments, the present disclosure is not limited by them. One skilled in the art can make possible changes and modifications of the present disclosure without departing from the spirit and scope of the present disclosure. Therefore, the scope of protection of the present disclosure is defined by the appended.

In a typical configuration, a computing device includes one or more processors (CPU), input/output interfaces, network interfaces, and memory.

The memory may include a form of computer readable media such as a volatile memory, a random access memory (RAM) and/or a non-volatile memory, for example, a read-only memory (ROM) or a flash RAM. The memory is an example of a computer readable media.

1. The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

2. One skilled in the art can understand that the embodiments of the present disclosure may be provided as a method, a system, or a computer program product. Accordingly, the present disclosure may be implemented using an entire hardware embodiment, an entire software embodiment or an embodiment that combines software and hardware components. Furthermore, the present disclosure may implement a computer program product in a form of one or more computer-usable storage media that include computer-usable program codes (which include, but not limited to, a magnetic disk storage device, a CD-ROM, an optical storage device, etc.).

The present disclosure may be further understood with clauses as follows.

Clause 1: A character segmentation method, comprising: obtaining character segmentation points of a character image to be segmented as candidate segmentation points using a predetermined segmentation point generation algorithm, the character image to be segmented being a foreground character image that is obtained by removing a background image from an original grayscale character image; selecting and obtaining correct segmentation points from the candidate segmentation points based on the original grayscale character image and a pre-generated segmentation point classifier; and performing character segmentation for the character image to be segmented based on the correct segmentation points.

Clause 2: The character segmentation method of Clause 1, wherein selecting and obtaining the correct segmentation points from the candidate segmentation points based on the original grayscale character image and the pre-generated segmentation point classifier comprises: capturing a respective image located between a left adjacent candidate segmentation point and a right adjacent candidate segmentation point of a candidate segmentation point from the original grayscale character image for each candidate segmentation point; obtaining a probability of including a correct segmentation point in the respective captured image using the pre-generated segmentation point classifier; and determining that the candidate segmentation point included in the respective captured image is a correct segmentation point if the probability of including the correct segmentation point is greater than a predetermined correct segmentation point probability threshold value.

Clause 3: The character segmentation method of Clause 2, further comprising: determining that the candidate segmentation point included in the respective captured image is an incorrect segmentation point if the probability of including the correct segmentation point is less than a predetermined incorrect segmentation point probability threshold value; determining that the candidate segmentation point included in the respective captured image is an uncertain segmentation point if the probability of including the correct segmentation point is less than or equal to the predetermined correct segmentation point probability threshold value and greater than or equal to the predetermined incorrect segmentation point probability threshold value; for each uncertain segmentation point, capturing an image located between a correct segmentation point that is adjacent to the left of the uncertain segmentation point and the uncertain segmentation point, an image located between the correct segmentation point that is adjacent to the left of the uncertain segmentation point and a correct segmentation point that is adjacent to the right of the uncertain segmentation point, and an image located between the uncertain segmentation point and the correct segmentation point that is adjacent to the right of the uncertain segmentation point from the original grayscale character image as a left image, a middle image, and a right image; obtaining a probability of the left image as a character, a probability of the middle image as a character, and a probability of the right image as a character using a predetermined character recognition apparatus; and determining that the uncertain candidate segmentation point is a correct segmentation point if the probability of the left image as a character and the probability of the right image as a character are both greater than the probability of the middle image as a character.

Clause 4: The character segmentation method of Clause 1, wherein the pre-generated segmentation point classifier is generated by: obtaining a training set that is formed by vector pairs of historical foreground character images and respective actual results of whether a correct segmentation point is included, and obtaining the pre-generated segmentation point classifier by learning through a machine learning algorithm.

Clause 5: The character segmentation method of Clause 4, wherein the machine learning algorithm includes a Bayesian algorithm, a decision tree algorithm, a support vector machine algorithm, or a neural network algorithm.

Clause 6: The character segmentation method of Clause 5, wherein the machine learning algorithm uses a convolutional neural network algorithm, and obtaining the pre-generated segmentation point classifier by learning through the machine learning algorithm comprises: traversing training data in the training set, taking historical foreground character images included in the training data as input images of a predetermined convolutional neural network model, and computing and obtaining outputs of the predetermined convolutional neural network model as prediction results of the training data; calculating a squared sum of differences between the prediction results of the training data and the actual results as an error of a current iteration of the training set; determining whether the error of the current iteration is less than an error of a previous iteration; if affirmative, adjusting a weight matrix of the predetermined convolutional neural network model based on a predetermined training rate and returning to the operation of traversing training data in the training set to continue the training; and if not, setting an adjusted convolutional neural network model as the segmentation point classifier.

Clause 7: The character segmentation method of Clause 1, wherein prior to obtaining the character segmentation points of the character image to be segmented using the predetermined segmentation point generation algorithm, the method further comprises performing image separation processing on the original grayscale character image to generate the character image to be segmented.

Clause 8: The character segmentation method of Clause 7, wherein performing the image separation processing on the original grayscale character image to generate the character image to be segmented is done by performing binarization processing the original grayscale character image to generate a binary character image as the character image to be segmented.

Clause 9: The character segmentation method of Clause 8, wherein performing binarization processing the original grayscale character image to generate the binary character image as the character image to be segmented comprises: obtaining pixel values of foreground pixels of the original grayscale character image through a global binarization algorithm; setting pixels having pixel values in the original grayscale character image that are less than a first pixel threshold value as first foreground pixels; setting an image formed by the first foreground pixels as a first foreground image; and binarizing the first foreground image through a local binarization algorithm, and separating and obtaining the binary character image from the first foregoing image.

Clause 10: The character segmentation method of Clause 9, wherein obtaining the pixel values of the foreground pixels of the original grayscale character image through the global binarization algorithm comprises: individually taking various pixel values in the original grayscale character image as candidate pixel threshold values, and calculating an inter-class variance between background images and foreground images that are obtained by separation using the candidate pixel threshold values; and selecting a candidate pixel threshold corresponding to a high rank in the inter-class variance as a pixel threshold value for the foreground pixels of the original grayscale character image.

Clause 11: The character segmentation method of Clause 10, wherein the inter-class variance is calculated using the following formula: $\sigma^2 = \omega_0 \cdot (\mu_0 - \mu)^2 + \omega_1 \cdot (\mu_1 - \mu)^2$, wherein $\sigma^2$ is the inter-class variance, $\mu$ is an average pixel value of the original grayscale character image, $\omega_0$ is a ratio between the number of pixels of the foreground image and the number of pixels of the original grayscale character image, $\omega_1$ is a ratio between the number of pixels of the background image and a number of pixels of the original grayscale character image, $\mu_0$ is an average pixel value of the foreground image, $\mu_1$ is an average pixel value of the background image, $\mu = \omega_0 \mu_0 + \omega_1 \mu_1$, $\omega_0 = N_0/(M*N)$, $\omega_1 = N_1/(M*N)$, M and N are width and height of the original grayscale character image, M*N is the number of pixels included in the original grayscale character image, $N_0$ is the number of pixels of the foreground image, and $N_1$ is the number of pixels of the background image.

Clause 12: The character segmentation method of Clause 9, wherein binarizing the first foreground image through the local binarization algorithm, and separating and obtaining the binary character image from the first foregoing image comprise: for pixels in the first foreground image, separately calculating average pixel values and pixel value variances for respective sub-images having a predetermined size and the pixels as respective centers; calculating and obtaining respective pixel threshold values of the foreground image corresponding to the pixels as respective second threshold values based on the average pixel values and the pixel value variances separately corresponding to the pixels; individually determining whether a pixel value of each pixel is less than a corresponding second threshold value; setting the pixel value of the pixel as a black color if affirmative; setting the pixel value of the pixel as a white color if not; and taking the first foreground image after a pixel value update as the binary character image.

Clause 13: The character segmentation method of Clause 12, wherein calculating and obtaining respective pixel threshold values of the foreground image corresponding to the pixels as respective second threshold values based on the average pixel values and the pixel value variances separately corresponding to the pixels use the following formula: $T(i,j)=m(i,j)+k\cdot\sigma(i,j)$, wherein $T(i,j)$ is a second pixel threshold value corresponding to a pixel at $i^{th}$ row and $j^{th}$ column in the first foreground image, $m(i,j)$ is an average pixel value corresponding to a pixel at $i^{th}$ row and $j^{th}$ column in the first foreground image, $\sigma(i,j)$ is a pixel variance corresponding to a pixel at $i^{th}$ row and $j^{th}$ column in the first foreground image, and k is a variance factor.

Clause 14: The character segmentation method of Clause 12, wherein the sub-images having the predetermined size include a square.

Clause 15: The character segmentation method of Clause 1, wherein prior to obtaining the character segmentation points of the character image to be segmented using the predetermined segmentation point generation algorithm, the method further comprises performing an inclined character correction processing on the character image to be segmented to generate an inclined-letter-corrected character image to be segmented.

Clause 16: The character segmentation method of Clause 15, wherein performing the inclined character correction processing on the character image to be segmented to generate the inclined-letter-corrected character image to be segmented comprises: obtaining predetermined edge pixels of characters included in the character image to be segmented; calculating and obtaining an angle of inclined character correction based on the obtained predetermined edge pixels, a predetermined starting correction angle and a predetermined ending correction angle; and performing the inclined character correction on the character image to be segmented based on the angle of inclined character correction to generate the inclined-letter-corrected character image to be segmented.

Clause 17: The character segmentation method of Clause 16, wherein the predetermined edge pixels include left edge pixels or right edge pixels.

Clause 18: The character segmentation method of Clause 16, wherein the predetermined edge pixels are left edge pixels, and obtaining the predetermined edge pixels of the characters included in the character image to be segmented is performed by setting a pixel as a left edge pixel if a pixel value of the pixel is less than a pixel value of a left adjacent pixel and the left adjacent pixel is white in color.

Clause 19: The character segmentation method of Clause 16, wherein calculating and obtaining the angle of inclined character correction based on the obtained predetermined edge pixels, the predetermined starting correction angle and the predetermined ending correction angle are performed by calculating an information entropy of various angles of inclination between the starting correction angle and the ending correction angle, and selecting an angle of inclination having a respective information entropy ranked at a low position to be the angle of included letter correction.

Clause 20: The character segmentation method of Clause 19, wherein calculating and obtaining the angle of inclined character correction based on the obtained predetermined edge pixels, the predetermined starting correction angle and the predetermined ending correction angle comprises: traversing various angles between the predetermined starting correction angle and the predetermined ending correction angle, and performing coordinate transformation on the obtained predetermined edge pixels of the characters based on the angles; projecting the predetermined edge pixels of the characters after the coordinate transformation on a horizontal axis, and constructing a projection histogram corresponding to the angles; calculating and obtaining information entropies corresponding to the various angles based on the projection histogram; and selecting an angle corresponding to an information entropy at a low position as the angle of inclined character correction.

Clause 21: The character segmentation method of Clause 20, wherein the information entropies are calculated using the following formula:

$$H(\theta) = -\sum_{i=1}^{M} \frac{h_i}{N} \log \frac{h_i}{N},$$

wherein M is a number of columns of the projection histogram, N is a total number of predetermined edge pixels of all the characters, and $h_i$ is a number of pixels that are projected onto an $i^{th}$ column.

Clause 22: The character segmentation method of Clause 16, wherein performing the inclined character correction on the character image to be segmented based on the angle of inclined character correction is done by performing coordinate transformation for each pixel included in characters of the character image to be segmented based on the angle of inclined character correction.

Clause 23: The character segmentation method of Clause 20 or 22, wherein performing coordinate transformation for each pixel is performed using the following formula: $(i,j) \rightarrow p(i-j\cdot\tan\theta, j)$, wherein $p(i,j)$ is a pixel to be transformed, and $i-j\cdot\tan\theta$ is a horizontal coordinate of a pixel position to which the pixel to be transformed is moved.

Clause 24: The character segmentation method of Clause 1, wherein the predetermined segmentation point generation algorithm includes a vertical projection based character segmentation method, a hyphenation based character segmentation method, a mathematical morphology based character segmentation method, a connected domain analysis based character segmentation method, or a recognition based character segmentation method.

25. The character segmentation method of claim 1, wherein the predetermined segmentation point generation algorithm adopts a projection based character segmentation method, and obtaining the character segmentation points of the character image to be segmented using the predetermined segmentation point generation algorithm comprises: projecting pixels in the character image to be segmented onto a horizontal axis, and constructing a projection histogram; treating a respective column as a character segmentation point of the character image to be segmented if a number of pixels of a left adjacent column is greater than a number of pixels of the respective column and a number of pixels of a right adjacent column is greater than the number of pixels of the respective column for each column in the projection histogram; and if the number of pixels of the left adjacent column is greater than the number of pixels of the respective column, numbers of pixels of more than one right adjacent column are greater than the number of pixel of the respective column, and a number of pixel of a right adjacent column of a rightmost column of the more than one right adjacent column is greater than a number of pixel of the rightmost column, treating a column located in the middle between the respective column and the right adjacent column of the rightmost column as the character segmentation point of the character image to be segmented.

Clause 26: A character segmentation apparatus comprising: a candidate segmentation point generation unit used for obtaining character segmentation points of a character image to be segmented as candidate segmentation points using a predetermined segmentation point generation algorithm, the character image to be segmented being a foreground character image that is obtained by removing a background image from an original grayscale character image; a selection unit used for selecting and obtaining correct segmentation points from the candidate segmentation points based on the original grayscale character image and a pre-generated segmentation point classifier; and a segmentation unit used for performing character segmentation for the character image to be segmented based on the correct segmentation points.

Clause 27: The character segmentation apparatus of Clause 26, wherein the selection unit comprises: a first capturing subunit used for capturing a respective image located between a left adjacent candidate segmentation point and a right adjacent candidate segmentation point of a candidate segmentation point from the original grayscale character image for each candidate segmentation point; a first computation subunit used for obtaining a probability of including a correct segmentation point in the respective captured image using the pre-generated segmentation point classifier; and a first determination subunit used for determining that the candidate segmentation point included in the respective captured image is a correct segmentation point if the probability of including the correct segmentation point is greater than a predetermined correct segmentation point probability threshold value.

Clause 28: The character segmentation apparatus of Clause 27, wherein the selection unit further comprises: a second determination subunit used for determining that the candidate segmentation point included in the respective captured image is an incorrect segmentation point if the probability of including the correct segmentation point is less than a predetermined incorrect segmentation point probability threshold value; a third determination subunit used for determining that the candidate segmentation point included in the respective captured image is an uncertain segmentation point if the probability of including the correct segmentation point is less than or equal to the predetermined correct segmentation point probability threshold value and greater than or equal to the predetermined incorrect segmentation point probability threshold value; a second capturing subunit used for, for each uncertain segmentation point, capturing an image located between a correct segmentation point that is adjacent to the left of the uncertain segmentation point and the uncertain segmentation point, an image located between the correct segmentation point that is adjacent to the left of the uncertain segmentation point and a correct segmentation point that is adjacent to the right of the uncertain segmentation point, and an image located between the uncertain segmentation point and the correct segmentation point that is adjacent to the right of the uncertain segmentation point as a left image, a middle image, and a right image respectively from the original grayscale character image; a second computation subunit used for obtaining a probability of the left image as a character, a probability of the middle image as a character, and a probability of the right image as a character using a predetermined character recognition apparatus; and a fourth determination subunit used for determining that the uncertain candidate segmentation point is a correct segmentation point if the probability of the left image as a character and the probability of the right image as a character are both greater than the probability of the middle image as a character.

Clause 29: The character segmentation apparatus of Clause 26, further comprising a classifier generation unit used for generating the pre-generated segmentation point classifier.

Clause 30: The character segmentation apparatus of Clause 29, wherein the classifier generation unit comprises: an acquisition subunit used for obtaining a training set that is formed by vector pairs of historical foreground character images and respective actual results of whether a correct segmentation point is included; and a learning subunit used for obtaining the pre-generated segmentation point classifier by learning through a machine learning algorithm.

Clause 31: The character segmentation apparatus of Clause 30, wherein the machine learning algorithm uses a convolutional neural network algorithm, and the learning subunit comprises: a first computation unit used for traversing training data in the training set, taking historical foreground character images included in the training data as input images of a predetermined convolutional neural network model, and computing and obtaining outputs of the predetermined convolutional neural network model as prediction results of the training data; a second computation subunit used for calculating a squared sum of differences between the prediction results of the training data and the actual results as an error of a current iteration of the training set; and a determination subunit used for determining whether the error of the current iteration is less than an error of a previous iteration, adjusting a weight matrix of the predetermined convolutional neural network model based on a predetermined training rate and returning to the traversing training data in the training set to continue the training if affirmative, and setting an adjusted convolutional neural network model as the segmentation point classifier if not.

Clause 32: The character segmentation apparatus of Clause 26, further comprising an image separation unit used for performing image separation processing on the original grayscale character image to generate the character image to be segmented.

Clause 33: The character segmentation apparatus of Clause 32, wherein performing the image separation processing on the original grayscale character image to generate the character image to be segmented is done by performing binarization processing the original grayscale character image to generate a binary character image as the character image to be segmented.

Clause 34: The character segmentation apparatus of Clause 33, wherein the image separation unit comprises: a first computation subunit used for obtaining pixel values of foreground pixels of the original grayscale character image through a global binarization algorithm; a first selection subunit used for setting pixels having pixel values in the original grayscale character image that are less than a first pixel threshold value as first foreground pixels; a first generation subunit used for setting an image formed by the first foreground pixels as a first foreground image; and a second generation subunit used for binarizing the first foreground image through a local binarization algorithm, and separating and obtaining the binary character image from the first foregoing image.

Clause 35: The character segmentation apparatus of Clause 34, wherein the first computation subunit comprises: a computation subunit used for individually taking various pixel values in the original grayscale character image as candidate pixel threshold values, and calculating an inter-class variance between background images and foreground images that are obtained by separation using the candidate pixel threshold values; and a selection subunit used for selecting a candidate pixel threshold corresponding to a high rank in the inter-class variance as a pixel threshold value for the foreground pixels of the original grayscale character image.

Clause 36: The character segmentation apparatus of Clause 34, wherein the second generation subunit comprises: a first computation subunit used for separately calculating average pixel values and pixel value variances for respective sub-images having a predetermined size and the pixels as respective centers; a second computation subunit used for calculating and obtaining respective pixel threshold values of the foreground image corresponding to the pixels as respective second threshold values based on the average pixel values and the pixel value variances separately corresponding to the pixels; a determination subunit used for individually determining whether a pixel value of each pixel is less than a corresponding second threshold value, setting the pixel value of the pixel as a black color if affirmative, and setting the pixel value of the pixel as a white color if not; and a setting subunit used for taking the first foreground image after a pixel value update as the binary character image.

Clause 37: The character segmentation apparatus of Clause 26, further comprising an inclined character correction unit used for performing an inclined character correction processing on the character image to be segmented to generate an inclined-letter-corrected character image to be segmented.

Clause 38: The character segmentation apparatus of Clause 37, wherein the inclined character correction unit comprises: an acquisition subunit used for obtaining predetermined edge pixels of characters included in the character image to be segmented; a computation subunit used for calculating and obtaining an angle of inclined character correction based on the obtained predetermined edge pixels, a predetermined starting correction angle and a predetermined ending correction angle; and a correction subunit used for performing the inclined character correction on the character image to be segmented based on the angle of inclined character correction to generate the inclined-letter-corrected character image to be segmented.

Clause 39 Clause The character segmentation apparatus of Clause 38, wherein the computation subunit comprises: a coordinate transformation subunit used for traversing various angles between predetermined starting correction angle and the predetermined ending correction angle, and performing coordinate transformation on the obtained predetermined edge pixels of the characters based on the angles; a projection unit used for projecting the predetermined edge pixels of the characters after the coordinate transformation on a horizontal axis, and constructing a projection histogram corresponding to the angles; a computation subunit used for calculating and obtaining information entropies corresponding to the various angles based on the projection histogram; and a selection subunit used for selecting an angle corresponding to an information entropy at a low position as the angle of inclined character correction.

Clause 40: The character segmentation apparatus of Clause 26, wherein the predetermined segmentation point generation algorithm adopts a projection based character segmentation method, and the candidate segmentation point generation unit comprises: a projection subunit used for projecting pixels in the character image to be segmented onto a horizontal axis, and constructing a projection histogram; and a determination subunit used for treating a respective column as a character segmentation point of the character image to be segmented if a number of pixels of a left adjacent column is greater than a number of pixels of the respective column and a number of pixels of a right adjacent column is greater than the number of pixels of the respective column for each column in the projection histogram, and if the number of pixels of the left adjacent column is greater than the number of pixels of the respective column, numbers of pixels of more than one right adjacent column are greater than the number of pixel of the respective column, and a number of pixel of a right adjacent column of a rightmost column of the more than one right adjacent column is greater than a number of pixel of the rightmost column, treating a column located in the middle between the respective column and the right adjacent column of the rightmost column as the character segmentation point of the character image to be segmented.

Clause 41 Clause An electronic device, comprising: a display; processor(s); and memory, the memory being configured to store a character segmentation apparatus, and the character segmentation apparatus that, when executed by the processor(s), performs the following operations: obtaining character segmentation points of a character image to be segmented as candidate segmentation points using a predetermined segmentation point generation algorithm, the character image to be segmented being a foreground character image that is obtained by removing a background image from an original grayscale character image; selecting and obtaining correct segmentation points from the candidate segmentation points based on the original grayscale character image and a pre-generated segmentation point classifier; and performing character segmentation for the character image to be segmented based on the correct segmentation points.

Clause 42: A character recognition system, comprising the character segmentation apparatus of Clause 26.

Clause 43: An image separation method, comprising: obtaining a gray image to be separated; obtaining a pixel threshold value of foreground pixels of the gray image to be separated as a first pixel threshold value through a global binarization algorithm; setting pixels with pixel values less than the first pixel threshold value in the gray image to be separated as first foreground pixels; setting an image formed by the first foreground pixels as a first foreground image; and binarizing the first foreground image through a local binarization algorithm, and separating and obtaining a binary image of the gray image to be separated from the first foreground image.

Clause 44: The image separation method of Clause 43, wherein setting the pixels with the pixel values less than the first pixel threshold value in the gray image to be separated as the first foreground pixels comprises: individually taking various pixel values in the gray image to be separated as candidate pixel threshold values, and calculating an inter-class variance between background images and foreground images that are obtained by separation using the candidate pixel threshold values; and selecting a candidate pixel threshold corresponding to a high rank in the inter-class variance as a pixel threshold value for the foreground pixels of the gray image to be separated.

Clause 45: The image separation method of Clause 44, wherein the inter-class variance is calculated using the following formula: $\sigma^2=\omega_0\cdot(\mu_0-\mu)^2+\omega_1\cdot(\mu_1-\mu)^2$, wherein $\sigma^2$ is the inter-class variance, $\mu$ is an average pixel value of the gray image to be separated, $\omega_0$ is a ratio between the number of pixels of the foreground image and the number of pixels of the gray image to be separated, $\omega_1$ is a ratio between the number of pixels of the background image and a number of pixels of the gray image to be separated, $\mu_0$ is an average pixel value of the foreground image, $\mu_1$ is an average pixel value of the background image, $\mu=\omega_0\mu_0+\omega_{1\mu_1}$, $\omega_0=N_0/(M*N)$, $\omega_1=N_1/(M*N)$, M and N are width and height of the gray image to be separated, M*N is the number of pixels included in the gray image to be separated, $N_0$ is the number of pixels of the foreground image, and $N_1$ is the number of pixels of the background image.

Clause 46: The image separation method of Clause 43, wherein binarizing the first foreground image through the local binarization algorithm, and separating and obtaining the binary character image from the first foregoing image comprise: for pixels in the first foreground image, separately calculating average pixel values and pixel value variances for respective sub-images having a predetermined size and the pixels as respective centers; calculating and obtaining respective pixel threshold values of the foreground image corresponding to the pixels as respective second threshold values based on the average pixel values and the pixel value variances separately corresponding to the pixels; individually determining whether a pixel value of each pixel is less than a corresponding second threshold value; setting the pixel value of the pixel as a black color if affirmative; and setting the pixel value of the pixel as a white color if not; and setting the first foreground image after a pixel value update as the binary character image.

Clause 47: The image separation method of Clause 46, wherein calculating and obtaining respective pixel threshold values of the foreground image corresponding to the pixels as respective second threshold values based on the average pixel values and the pixel value variances separately corresponding to the pixels use the following formula: $T(i,j)=m(i,j)+k\cdot\sigma(i,j)$, wherein $T(i,j)$ is a second pixel threshold value corresponding to a pixel at $i^{th}$ row and $j^{th}$ column in the first foreground image, $m(i,j)$ is an average pixel value corresponding to a pixel at $i^{th}$ row and $j^{th}$ column in the first foreground image, $\sigma(i,j)$ is a pixel variance corresponding to a pixel at $i^{th}$ row and $j^{th}$ column in the first foreground image, and k is a variance factor.

Clause 48: The image separation method of Clause 46, wherein the sub-images having the predetermined size include a square.

Clause 49: An image separation apparatus comprising: an acquisition unit used for obtaining a gray image to be separated; a first computation unit used for obtaining a pixel threshold value of foreground pixels of the gray image to be separated as a first pixel threshold value through a global binarization algorithm; a first selection unit used for setting pixels with pixel values less than the first pixel threshold value in the gray image to be separated as first foreground pixels; a first generation unit used for setting an image formed by the first foreground pixels as a first foreground image; and a second generation unit used for binarizing the first foreground image through a local binarization algorithm, and separating and obtaining a binary image of the gray image to be separated from the first foreground image.

Clause 50: The image separation apparatus of Clause 49, wherein the first computation unit comprises: a computation subunit used for individually taking various pixel values in the gray image to be separated as candidate pixel threshold values, and calculating an inter-class variance between background images and foreground images that are obtained by separation using the candidate pixel threshold values; and a selection subunit used for selecting a candidate pixel threshold corresponding to a high rank in the inter-class variance as a pixel threshold value for the foreground pixels of the gray image to be separated.

Clause 51: The image separation apparatus of Clause 49, wherein the second generation unit comprises: a first computation subunit used for, for pixels in the first foreground image, separately calculating average pixel values and pixel value variances for respective sub-images having a predetermined size and the pixels as respective centers; a second computation unit used for calculating and obtaining respective pixel threshold values of the foreground image corresponding to the pixels as respective second threshold values based on the average pixel values and the pixel value variances separately corresponding to the pixels; a determination subunit used for individually determining whether a pixel value of each pixel is less than a corresponding second threshold value, setting the pixel value of the pixel as a black color if affirmative, and setting the pixel value of the pixel as a white color if not; and a setting subunit used for setting the first foreground image after a pixel value update as the binary character image.

Clause 52: An electronic device comprising: a display; processor(s); and memory, the memory being configured to store an image separation apparatus, and the image separation apparatus that, when executed by the processor(s), performs the following operations: obtaining a gray image to be separated; obtaining a pixel threshold value of foreground pixels of the gray image to be separated as a first pixel threshold value through a global binarization algorithm; setting pixels with pixel values less than the first pixel threshold value in the gray image to be separated as first foreground pixels; setting an image formed by the first foreground pixels as a first foreground image; and binarizing the first foreground image through a local binarization algorithm, and separating and obtaining a binary image of the gray image to be separated from the first foreground image.

Clause 53: An inclined character correction method, comprising: obtaining predetermined edge pixels of characters included in a character image to be corrected; calculating and obtaining an angle of inclined character correction based on the obtained predetermined edge pixels, a predetermined starting correction angle and a predetermined ending correction angle; and performing the inclined character correction on the character image to be corrected based on the angle of inclined character correction to generate an inclined-letter-corrected character image.

Clause 54 Clause The inclined character correction method of Clause 53, wherein the predetermined edge pixels include left edge pixels or right edge pixels.

Clause 55: The inclined character correction method of Clause 53, wherein the predetermined edge pixels are left edge pixels, and obtaining the predetermined edge pixels of the characters included in the character image to be corrected is performed using the following approach: setting a pixel as a left edge pixel if a pixel value of the pixel is less than a pixel value of a left adjacent pixel and the left adjacent pixel is white in color.

Clause 56: The inclined character correction method of Clause 53, wherein calculating and obtaining the angle of inclined character correction based on the obtained predetermined edge pixels, the predetermined starting correction angle and the predetermined ending correction angle are performed by calculating an information entropy of various angles of inclination between the starting correction angle and the ending correction angle, and selecting an angle of inclination having a respective information entropy ranked at a low position to be the angle of included letter correction.

Clause 57: The inclined character correction method of Clause 56, wherein calculating and obtaining the angle of inclined character correction based on the obtained predetermined edge pixels, the predetermined starting correction angle and the predetermined ending correction angle comprises: traversing various angles between the predetermined starting correction angle and the predetermined ending correction angle, and performing coordinate transformation on the obtained predetermined edge pixels of the characters based on the angles; projecting the predetermined edge pixels of the characters after the coordinate transformation on a horizontal axis, and constructing a projection histogram corresponding to the angles; calculating and obtaining information entropies corresponding to the various angles based on the projection histogram; and selecting an angle corresponding to an information entropy at a low position as the angle of inclined character correction.

Clause 58: The inclined character correction method of Clause 57, wherein the information entropies are calculated using the following formula:

$$H(\theta) = -\sum_{i=1}^{M} \frac{h_i}{N} \log \frac{h_i}{N},$$

wherein M is a number of columns of the projection histogram, N is a total number of predetermined edge pixels of all the characters, and $h_i$ is a number of pixels that are projected onto an $i^{th}$ column.

Clause 59: The inclined character correction method of Clause 53, wherein performing the inclined character correction on the character image to be corrected based on the angle of inclined character correction is done by performing coordinate transformation for each pixel included in characters of the character image to be corrected based on the angle of inclined character correction.

Clause 60: The inclined character correction method of Clause 57 or 59, wherein performing coordinate transformation for each pixel is performed using the following formula: (i,j)→p(i−j·tan σ, j), wherein p(i,j) is a pixel to be transformed, and i−j·tan θ is a horizontal coordinate of a pixel position to which the pixel to be transformed is moved.

Clause 61: An inclined character correction apparatus, comprising: an acquisition unit used for obtaining predetermined edge pixels of characters included in a character image to be corrected; a computation unit used for calculating and obtaining an angle of inclined character correction based on the obtained predetermined edge pixels, a predetermined starting correction angle and a predetermined ending correction angle; and a correction unit used for performing the inclined character correction on the character image to be corrected based on the angle of inclined character correction to generate an inclined-letter-corrected character image.

Clause 62: The inclined character correction apparatus of Clause 61, wherein the computation unit comprises: a coordinate transformation subunit used for traversing various angles between the predetermined starting correction angle and the predetermined ending correction angle, and performing coordinate transformation on the obtained predetermined edge pixels of the characters based on the angles; a projection subunit projecting the predetermined edge pixels of the characters after the coordinate transformation on a horizontal axis, and constructing a projection histogram corresponding to the angles; a computation subunit used for calculating and obtaining information entropies corresponding to the various angles based on the projection histogram; and a selection subunit used for selecting an angle corresponding to an information entropy at a low position as the angle of inclined character correction.

Clause 63: An electronic device comprising: a display; processor(s); and memory, the memory being configured to store an inclined character correction apparatus, and the inclined character correction apparatus that, when executed by the processor(s), performs the following operations: obtaining predetermined edge pixels of characters included in a character image to be corrected; calculating and obtaining an angle of inclined character correction based on the obtained predetermined edge pixels, a predetermined starting correction angle and a predetermined ending correction angle; performing the inclined character correction on the character image to be corrected based on the angle of inclined character correction to generate an inclined-letter-corrected character image.

The invention claimed is:

1. A method comprising:
obtaining character segmentation points of a character image as candidate segmentation points using a predetermined segmentation point generation algorithm, the character image being a foreground character image that is obtained by removing a background image from an original grayscale character image;
selecting correct segmentation points from the candidate segmentation points based on the original grayscale character image and a pre-generated segmentation point classifier, the pre-generated segmentation point classifier obtained by using a convolutional neural network algorithm including:
traversing training data in training set, taking historical foreground character images included in the training data as input images of a predetermined convolutional neural network model, and computing and obtaining outputs of the predetermined convolutional neural network model as prediction results of the training data,
calculating a squared sum of differences between the prediction results of the training data and the actual results as an error of a current iteration of the training set, and
determining whether the error of the current iteration is less than an error of a previous iteration; and
performing character segmentation for the character image based on the correct segmentation points.

2. The method of claim 1, wherein selecting the correct segmentation points from the candidate segmentation points based on the original grayscale character image and the pre-generated segmentation point classifier comprises:
capturing a respective image located between a left adjacent candidate segmentation point and a right adjacent candidate segmentation point of a candidate segmentation point from the original grayscale character image for each candidate segmentation point;

obtaining a probability of including a correct segmentation point in the respective captured image using the pre-generated segmentation point classifier; and determining that the candidate segmentation point included in the respective captured image is a correct segmentation point if the probability of including the correct segmentation point is greater than a predetermined correct segmentation point probability threshold value.

3. The method of claim 1, wherein the training set is formed by vector pairs of the historical foreground character images and respective actual results of whether a correct segmentation point is included.

4. The method of claim 3, wherein:

upon determining that the error of the current iteration is less than the error of the previous iteration, adjusting a weight matrix of the predetermined convolutional neural network model based on a predetermined training rate and returning to the operation of traversing training data in the training set to continue the training; and upon determining that the error of the current iteration is not less than the error of the previous iteration, setting an adjusted convolutional neural network model as the segmentation point classifier.

5. The method of claim 1, wherein prior to obtaining the character segmentation points of the character image using the predetermined segmentation point generation algorithm, the method further comprises performing image separation processing on the original grayscale character image to generate the character image.

6. The method of claim 5, wherein performing the image separation processing on the original grayscale character image to generate the character image is done by performing binarization processing the original grayscale character image to generate a binary character image as the character image.

7. The method of claim 6, wherein performing binarization processing the original grayscale character image to generate the binary character image as the character image comprises:

obtaining pixel values of foreground pixels of the original grayscale character image through a global binarization algorithm;

setting pixels having pixel values in the original grayscale character image that are less than a first pixel threshold value as first foreground pixels;

setting an image formed by the first foreground pixels as a first foreground image; and binarizing the first foreground image through a local binarization algorithm, and separating and obtaining the binary character image from the first foregoing image.

8. The method of claim 7, wherein obtaining the pixel values of the foreground pixels of the original grayscale character image through the global binarization algorithm comprises:

individually taking various pixel values in the original grayscale character image as candidate pixel threshold values, and calculating an inter-class variance between background images and foreground images that are obtained by separation using the candidate pixel threshold values; and selecting a candidate pixel threshold corresponding to a high rank in the inter-class variance as a pixel threshold value for the foreground pixels of the original grayscale character image.

9. The method of claim 7, wherein binarizing the first foreground image through the local binarization algorithm, and separating and obtaining the binary character image from the first foregoing image comprise:

for pixels in the first foreground image, separately calculating average pixel values and pixel value variances for respective sub-images having a predetermined size and the pixels as respective centers;

calculating and obtaining respective pixel threshold values of the foreground image corresponding to the pixels as respective second threshold values based on the average pixel values and the pixel value variances separately corresponding to the pixels;

individually determining whether a pixel value of each pixel is less than a corresponding second threshold value;

setting the pixel value of the pixel as a black color if affirmative;

setting the pixel value of the pixel as a white color if not; and taking the first foreground image after a pixel value update as the binary character image.

10. The method of claim 1, wherein prior to obtaining the character segmentation points of the character image using the predetermined segmentation point generation algorithm, the method further comprises performing an inclined character correction processing on the character image to generate an inclined-letter-corrected character image.

11. The method of claim 10, wherein performing the inclined character correction processing on the character image to generate the inclined-letter-corrected character image comprises:

obtaining predetermined edge pixels of characters included in the character image;

calculating and obtaining an angle of inclined character correction based on the obtained predetermined edge pixels, a predetermined starting correction angle and a predetermined ending correction angle; and performing the inclined character correction on the character image based on the angle of inclined character correction to generate the inclined-letter-corrected character image.

12. The method of claim 11, wherein the predetermined edge pixels are left edge pixels, and obtaining the predetermined edge pixels of the characters included in the character image is performed by setting a pixel as a left edge pixel if a pixel value of the pixel is less than a pixel value of a left adjacent pixel and the left adjacent pixel is white in color.

13. The method of claim 11, wherein calculating and obtaining the angle of inclined character correction based on the obtained predetermined edge pixels, the predetermined starting correction angle and the predetermined ending correction angle are performed by calculating an information entropy of various angles of inclination between the starting correction angle and the ending correction angle, and selecting an angle of inclination having a respective information entropy ranked at a low position to be the angle of included letter correction.

14. The method of claim 13, wherein calculating and obtaining the angle of inclined character correction based on the obtained predetermined edge pixels, the predetermined starting correction angle and the predetermined ending correction angle comprises:

traversing various angles between the predetermined starting correction angle and the predetermined ending correction angle, and performing coordinate transformation on the obtained predetermined edge pixels of the characters based on the angles;

projecting the predetermined edge pixels of the characters after the coordinate transformation on a horizontal axis, and constructing a projection histogram corresponding to the angles;

calculating and obtaining information entropies corresponding to the various angles based on the projection histogram; and selecting an angle corresponding to an information entropy at a low position as the angle of inclined character correction.

15. The method of claim 11, wherein performing the inclined character correction on the character image to be segmented based on the angle of inclined character correction is done by performing coordinate transformation for each pixel included in characters of the character image based on the angle of inclined character correction.

16. The method of claim 1, wherein the predetermined segmentation point generation algorithm adopts a projection based character segmentation method, and obtaining the character segmentation points of the character image using the predetermined segmentation point generation algorithm comprises:

projecting pixels in the character image onto a horizontal axis, and constructing a projection histogram;

treating a respective column as a character segmentation point of the character image to be segmented if a number of pixels of a left adjacent column is greater than a number of pixels of the respective column and a number of pixels of a right adjacent column is greater than the number of pixels of the respective column for each column in the projection histogram; and if the number of pixels of the left adjacent column is greater than the number of pixels of the respective column, numbers of pixels of more than one right adjacent column are greater than the number of pixel of the respective column, and a number of pixel of a right adjacent column of a rightmost column of the more than one right adjacent column is greater than a number of pixel of the rightmost column, treating a column located in the middle between the respective column and the right adjacent column of the rightmost column as the character segmentation point of the character image.

17. An apparatus comprising:

an acquisition unit used for obtaining a gray image;

a first computation unit used for obtaining a pixel threshold value of foreground pixels of the gray image as a first pixel threshold value through a global binarization algorithm;

a first selection unit used for setting pixels with pixel values less than the first pixel threshold value in the gray image as first foreground pixels;

a first generation unit used for setting an image formed by the first foreground pixels as a first foreground image; and a second generation unit used for binarizing the first foreground image through a local binarization algorithm, and separating and obtaining a binary image of the gray image from the first foreground image.

18. The apparatus of claim 17, wherein the first computation unit comprises:

a computation subunit used for individually taking various pixel values in the gray image as candidate pixel threshold values, and calculating an inter-class variance between background images and foreground images that are obtained by separation using the candidate pixel threshold values; and a selection subunit used for selecting a candidate pixel threshold corresponding to a high rank in the inter-class variance as a pixel threshold value for the foreground pixels of the gray image.

19. One or more computer-readable media storing executable instructions that, when executed by one or more processors, cause the one or more processors to perform acts comprising:

obtaining predetermined edge pixels of characters included in a character image;

calculating and obtaining an angle of inclined character correction based on the obtained predetermined edge pixels, a predetermined starting correction angle and a predetermined ending correction angle; and performing the inclined character correction on the character image based on the angle of inclined character correction to generate an inclined-letter-corrected character image.

20. The inclined character correction method of claim 19, wherein calculating and obtaining the angle of inclined character correction based on the obtained predetermined edge pixels, the predetermined starting correction angle and the predetermined ending correction angle are performed by calculating an information entropy of various angles of inclination between the starting correction angle and the ending correction angle, and selecting an angle of inclination having a respective information entropy ranked at a low position to be the angle of included letter correction.

* * * * *